(12) United States Patent
Fruhmann et al.

(10) Patent No.: US 8,444,162 B2
(45) Date of Patent: *May 21, 2013

(54) BEARING MECHANISM FOR A TRANSVERSE LEAF SPRING, MOUNTABLE IN THE AREA OF A VEHICLE AXLE

(75) Inventors: Gabriele Fruhmann, Bregenz (AT); Volker Wagner, Ravensburg (DE); Jens Heimann, Stetten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/392,114

(22) PCT Filed: Aug. 11, 2010

(86) PCT No.: PCT/EP2010/061676
§ 371 (c)(1),
(2), (4) Date: Feb. 24, 2012

(87) PCT Pub. No.: WO2011/023547
PCT Pub. Date: Mar. 3, 2011

(65) Prior Publication Data
US 2012/0146308 A1   Jun. 14, 2012

(30) Foreign Application Priority Data
Aug. 26, 2009   (DE) .................. 10 2009 028 899

(51) Int. Cl.
*B60G 11/00*   (2006.01)
(52) U.S. Cl.
USPC ...................................... 280/124.175; 267/7

(58) Field of Classification Search
USPC .............. 280/124.17, 124.171, 124.175, 680, 280/686; 267/3, 6, 7, 30, 140.4, 141.1–141.5
See application file for complete search history.

(56) References Cited

U.S. PATENT DOCUMENTS

| | | | |
|---|---|---|---|
| 2,697,613 A * | 12/1954 | Giacosa | 280/124.14 |
| 3,181,641 A | 5/1965 | Haddad | |
| 3,377,060 A | 4/1968 | Sherwood | |
| 4,630,804 A | 12/1986 | Fesko | |
| 4,643,406 A | 2/1987 | Mounier-Poulat et al. | |
| 4,684,110 A | 8/1987 | Sale et al. | |
| 5,826,896 A * | 10/1998 | Baumann | 280/124.171 |
| 6,220,580 B1 * | 4/2001 | Balczun | 267/7 |
| 7,651,107 B1 * | 1/2010 | Chapin et al. | 280/124.165 |

(Continued)

FOREIGN PATENT DOCUMENTS

| | | |
|---|---|---|
| DE | 4239512 A1 | 5/1994 |
| DE | 19533803 A1 | 3/1997 |

(Continued)

*Primary Examiner* — Drew Brown
(74) *Attorney, Agent, or Firm* — Davis & Bujold, PLLC

(57) ABSTRACT

A bearing mechanism for a transverse leaf spring that can be mounted near an axle of a vehicle. The bearing mechanism has an outer bearing shell device and insertion devices which have at least some regions encompassed by the outer bearing shell device. Each of the insertion devices comprise at least two layer elements which have different stiffness. In the assembled state, the insertion devices are each disposed between the outer bearing shell device and the transverse leaf spring. The outer bearing shell device comprises a one-piece bearing ring element, and the insertion devices can be operatively connected, at least in a force locking manner, to the bearing ring element and the transverse leaf spring, via tensioning elements.

17 Claims, 21 Drawing Sheets

U.S. PATENT DOCUMENTS

| | | | |
|---|---|---|---|
| 2012/0146308 A1* | 6/2012 | Fruhmann et al. | 280/124.175 |
| 2012/0146309 A1* | 6/2012 | Fruhmann et al. | 280/124.175 |
| 2012/0146310 A1* | 6/2012 | Fruhmann et al. | 280/124.175 |
| 2012/0153593 A1* | 6/2012 | Fruhmann et al. | 280/124.175 |
| 2012/0153594 A1* | 6/2012 | Heimann et al. | 280/124.175 |

FOREIGN PATENT DOCUMENTS

| | | |
|---|---|---|
| DE | 102 28 902 A1 | 2/2004 |
| EP | 0 373 389 A2 | 6/1990 |
| EP | 0 763 438 A2 | 3/1997 |
| EP | 0993971 A2 | 4/2000 |
| EP | 1 645 445 A1 | 4/2006 |
| FR | 2543073 A1 | 9/1984 |
| JP | 4059406 A | 2/1992 |
| JP | 4 297313 A | 10/1992 |
| JP | 7 039242 B | 5/1995 |
| WO | 2008/125076 A1 | 10/2008 |

* cited by examiner

BEARING MECHANISM FOR A TRANSVERSE LEAF SPRING, MOUNTABLE IN THE AREA OF A VEHICLE AXLE

This application is a national stage completition of PCT/EP2010/061676 filed Aug. 11, 2010 which claims priority from German Application Serial No. 10 2009 028 899.6 filed Aug. 26, 2009.

FIELD OF THE INVENTION

The invention relates to a bearing mechanism for a transverse leaf spring that can be mounted in the region of a vehicle axle of a vehicle.

BACKGROUND OF THE INVENTION

A wheel suspension for a motor vehicle having a transverse leaf spring disposed transverse to the motor vehicle is known from the document EP 1 645 445 B1. The transverse leaf spring comprises a central region and two opposing end regions, where the transverse leaf spring is connected in the central region to a vehicle chassis via two central bearings, and in the end regions it is operatively connected to wheel carriers via end bearings.

The central bearings are each formed having two outer bearing shells that can be connected together and having insertion devices encompassed by the outer bearing shells. The insertion devices each comprise at least two layer elements having different stiffness, wherein, in the assembled state, the insertion devices are each disposed between the outer bearing shells and the transverse leaf spring.

The layer elements of the insertion devices that in the installed state face toward the transverse leaf spring and are designed with increased stiffness, are bolted together in the longitudinal direction of the vehicle, both before and after the transverse leaf spring, whereby the insertion devices can be preassembled at the transverse leaf spring independently of the outer bearing shells. In addition, pretensioning forces in the region of the insertion devices can be precisely adjusted via the bolted connections. The outer bearing shells are securely connected together via a separate bolted connection, and abut each other in the region of a separation plane.

Disadvantageously, the above-described leaf spring suspension is characterized by a need for a large amount of construction space and by production complexity that is greater than desired, in the region of the central bearings in particular, since the layer elements of the insertion devices, which can be bolted together, must be solid design and provided with a thread impression in order to receive the bolting regions and transmit the pretensioning forces. In addition, the central bearings comprise a large number of parts, thereby further increasing the need for construction space and the production costs.

A transverse leaf spring made of a fiber-plastic composite material, and a bearing mechanism for a transverse leaf spring that can be mounted in the region of a vehicle axle of a vehicle is known from WO 2008/125076 A1. To ensure that axial motions of the transverse leaf spring in the installed state on a motor vehicle can be ruled out, and to provide a microstructure of the transverse leaf spring that is not destroyed, the transverse leaf spring is formed in the region of a central fastening section perpendicular to the longitudinal axis thereof with at least one constriction point into which a force introduction element of the bearing mechanism can be inserted in a form-locking and force locking manner. The constriction point is formed in the region of a surface of the transverse leaf spring, the surface normal of which is oriented substantially horizontal in the mounted state of the transverse leaf spring in a vehicle.

A disadvantage thereof is that the bearing mechanism comprises rigid bearing elements which impede movement of the transverse leaf spring in the loaded bearing region and thereby impair an overall behavior of the spring system and the overall spring action to an undesired extent.

SUMMARY OF THE INVENTION

Therefore, the problem addressed by the present invention is that of providing a bearing mechanism of a transverse leaf spring that can be mounted in the region of a vehicle axle of a vehicle, which can be produced easily and cost effectively, is characterized by a low construction space requirement, and in the region of which movement of a transverse leaf spring is ensured to an extent necessary for the operation.

The bearing mechanism according to the invention for a transverse leaf spring that can be mounted in the region of a vehicle axle of a vehicle is equipped with an outer bearing shell device and insertion devices, at least some regions of which are encompassed by the outer bearing shell device. The insertion devices each comprise at least two layer elements having different stiffness, wherein, in the assembled state, the insertion devices are each disposed between the outer bearing shell device and the transverse leaf spring.

According to the invention, the outer bearing shell device comprises a one-piece bearing ring element, and the insertion devices can be operatively connected at least in a force locking manner to the bearing ring element and the transverse leaf spring via tensioning elements.

The bearing mechanism according to the invention has a design that is more favorable with respect to construction space in comparison to bearing mechanisms known from the prior art, because this bearing mechanism is only mounted to a vehicle chassis, or to an auxiliary frame connected to the vehicle chassis, in the region of the bearing ring element. The fixed connection of the bearing mechanism to the transverse leaf spring is produced using the tensioning elements interacting with the insertion devices in the assembled state, and via these tensioning elements, pretensioning force can be applied to the insertion devices.

As there are no additional bolt devices in the region of the insertion devices, then, compared to the solutions known from the prior art, the layer elements can be designed with small dimensions and also produced cost-effectively because no threads need to be cut into the layer element, for example.

In addition, rotational movement of the transverse leaf spring in the region of the bearing mechanism required for operating the transverse leaf spring with simultaneously sufficiently high bearing rigidity is possible due to the layer elements of the insertion devices being designed with different stiffnesses, whereby different spring rates can be adjusted for the unidirectional and alternating deflections in the region of the wheels of the two sides of the vehicle.

In addition, wheel suspension functions can also be adjusted using the transverse leaf spring due to the different stiffnesses of the layer elements, because bearing stiffness in the transverse direction of the vehicle for example can be set appropriately high, and shifting of the transverse leaf spring in the transverse direction of the vehicle can be avoided in a simple manner.

Additionally, bearing stiffness of the bearing mechanism according to the invention can be sufficiently adjusted also in the vertical direction of the vehicle by means of a sufficient frictional connection between the bearing mechanism and the transverse leaf spring. In this simple manner, it is possible during alternating deflections to avoid undesired shifting corresponding to a rigid body, or movement of the transverse leaf spring in the region of the bearing mechanism. With appropriately high bearing stiffness of the bearing mechanism according to the invention in the vertical direction of the vehicle, a targeted deformation of the transverse leaf spring is attained in the shape of a so-called S-stroke, resulting in a higher alternating spring rate in the region of the transverse leaf spring compared to simultaneous deflections without an appropriate S-stroke.

As the outer bearing shell device is designed with a closed, and one-piece bearing ring element, the pretensioning force is easily adjustable in the region of the bearing mechanisms, which in contrast to the pretensioning force applied via a bolted connection that is used for connecting separate outer bearing shells, that decreases to a lesser extent due to setting processes and the like. Furthermore, the closed bearing ring element also guarantees improved force flow. In contrast to outer bearing shells designed having two-parts, a relative shift between the two outer bearing shells is also prevented in a simple manner due to the closed annular shape of the bearing ring element.

In an advantageous further development of the bearing mechanism according to the invention, the tensioning elements are formed with it least one wedge-shaped region that can be disposed between the insertion devices and the transverse leaf spring and/or between the insertion devices and the bearing ring element. Thus, the pretensioning force necessary for operating the bearing mechanism can be adjusted during assembly in a simple manner, independent of manufacturing tolerances in the region of the bearing mechanism and also in the region of the transverse leaf spring, because possibly present manufacturing tolerances can be compensated by varying the insertion path of the tensioning elements between the insertion devices and the transverse leaf spring and/or between the insertion devices and the bearing ring element.

In an embodiment of the bearing mechanism according to the invention characterized by simple assembly and simple constructive design, at least one part of the tensioning elements for creating a tensioning element-side pretensioning force on the insertion devices and the transverse leaf spring can be operatively connected to the bearing ring element, and the pretensioning force can be supported on a shoulder of the bearing ring element.

A further easily assembled embodiment of the bearing mechanism according to the invention is formed with connecting regions in the region of the bearing ring element, via which the bearing ring element can be secured on the vehicle chassis-side.

In a further embodiment of the bearing mechanism according to the invention, assembly of the bearing mechanism according to the invention is further simplified in that the bearing ring element in the assembled state in a contact region facing a vehicle chassis is formed with a centering region that corresponds to a centering region on the vehicle chassis. The bearing ring element or the bearing mechanism can be oriented and positioned with respect to the vehicle chassis or the auxiliary frame fixedly connected thereto during assembly without any further auxiliary means, thereby ensuring that the bearing mechanism is disposed in the position required or intended for trouble-free operation of the transverse leaf spring.

In a development of the bearing mechanism according to the invention that is favorable in terms of construction space and has a simple design, the tensioning elements are held in a position that generates the pretensioning force via a plate that can be connected to the bearing ring element.

An embodiment of the bearing mechanism according to the invention that is an alternative thereto and is low-cost comprises a locking ring which can be connected to the bearing ring element, by way of which the tensioning elements can each be held in a position that generates the pretensioning force.

To prevent the tensioning elements from autonomously detaching, which is undesired, after assembly of the bearing mechanism according to the invention in a manner that utilizes a simple design and/or to reduce relative movements between the tensioning elements and the components resting thereon to a minimum, in a further advantageous embodiment of the bearing mechanism according to the invention, a coefficient of friction in defined surface regions of the tensioning elements is higher than in other surface regions of the tensioning elements.

To ensure that the pretensioning force is introduced into the insertion devices via the tensioning elements as uniformly as possible, in a further advantageous embodiment of the bearing mechanism according to the invention, the tensioning elements are disposed between the layer elements of the insertion devices of the transverse leaf spring formed with greater stiffness, and/or between the bearing ring element and the layer elements of the insertion devices formed with greater stiffness.

In order to be able to transfer forces and torques acting during operation of a vehicle from the layer elements with the lowest possible surface pressure and designed with low stiffness, into the region between the insertion devices and transverse leaf spring, an insertion part of the insertion devices that is at least nearly semi-cylindrical, is disposed in each case between the layer elements of the insertion devices and the transverse leaf spring; the insertion part being designed preferably with greater stiffness than the layer elements designed with lower stiffness.

The term insertion parts designed at least nearly semi-cylindrically includes all volumetric shapes which are designed at least having at least nearly circular segment-like base surfaces offset to each other. The possibility exists that the curve of the base connecting the chord ends is designed having a circular or elliptical shape. In further developments, the chord is formed straight or possibly curved, preferably convex. Depending on the respective application case, the region of the transitions between the chord and the curve of the base can have edges or corresponding roundings.

In order to avoid damaging the transverse leaf spring in the region of the bearing mechanism during operation of the vehicle, the insertion parts of the insertion devices can be formed having a resilient protective coating at least in contact regions facing the transverse leaf spring in the assembled state. In a further advantageous embodiment of the bearing mechanism according to the invention, alternatively or in addition thereto, the layer elements formed with greater stiffness are provided with a resilient protective coating in the end regions, at least in sections.

In an embodiment of the bearing mechanism according to the invention characterized by good force introduction, the tensioning elements can be disposed between the transverse leaf spring and the insertion parts.

To enable acting forces and torques to be introduced from insertion devices into the transverse leaf spring without relative movement between the insertion devices and the transverse leaf spring during operation of a vehicle, in a further advantageous embodiment of the bearing mechanism according to the invention, at least one of the insertion devices in a contact surface facing a support surface is designed having at least one receiving device into which a region of the transverse leaf spring engages in the assembled state of the insertion devices. The bearing mechanism according to the invention is therefore connected to the transverse leaf spring via the frictional connection produced by the bolt device and in a form-locking manner, wherein the form-locking between the bearing mechanism and the transverse leaf spring is preferably designed such that the lowest possible additional stresses arise in the transverse leaf spring due to the form locking; such stresses possibly impact the function of the transverse leaf spring to an undesired extent and reduce a service life of the transverse leaf spring.

Additionally or alternatively thereto, in further advantageous embodiments of the bearing mechanism according to the invention, a form-locking can be produced between the bearing mechanism and the transverse leaf spring in that, in the region of one of the support surfaces of the transverse leaf spring a recess is formed for each of the insertion devices, and at least sections of the insertion devices engage therein in a form-locking manner.

Preferably, the region of the transverse leaf spring engaging into the insertion devices is in the region of the recess of the transverse leaf spring, whereby progression of fibers of a transverse leaf spring preferably produced from a composite material deviate only minimally in the region of the bearing mechanism from the progression necessary for the operation of the transverse leaf spring.

In a further advantageous embodiment of the bearing mechanism according to the invention, the layer elements formed with the lower stiffness overlap the transverse leaf spring with stop regions in the assembled state in the longitudinal direction of the vehicle and in the vertical direction of the vehicle at least in sections, in order to be able to position the multi-part insertion devices during assembly in a simple manner with respect to the transverse leaf spring, and to be able to supply a soft support of the transverse leaf spring in the longitudinal direction of the vehicle in the region of the outer bearing shells in a constructively simple manner.

The stop regions can be designed in the contact regions facing the transverse leaf spring and/or in the contact regions facing the outer bearing shells, with projections and/or recesses oriented at least nearly in the longitudinal direction of the vehicle, in order to attain different bearing stiffnesses via the shift of the transverse leaf spring in the region of the bearing mechanism according to the invention, where the stop regions acting as a bearing stops can be designed differently ahead of and behind the transverse leaf spring in the longitudinal direction of the vehicle with respect to a front of the vehicle, in order to be able to represent correspondingly different bearing characteristics.

Further advantages and advantageous embodiments of the subject matter according to the invention arise from the patent claims and the example embodiments described in the following based on the drawings, where for the sake of clarity, in the description of the different example embodiments components that are the same or functionally equivalent are provided with the same reference numbers.

Features specified in the dependent claims as well as the features specified in the following example embodiments of the bearing mechanism according to the invention are suitable, alone or in any arbitrary combination of the subject matter according to the invention, to be further developed. The respective combinations of features with respect to the further development of the subject matter according to the invention do not represent limitations, but rather merely comprise examples.

BRIEF DESCRIPTION OF THE DRAWINGS

They show.

FIG. 12b a simplified side view of the top surface region shown in FIG. 12a;

DETAILED DESCRIPTION OF THE PREFERRED EMBODIMENTS

Figure 1:
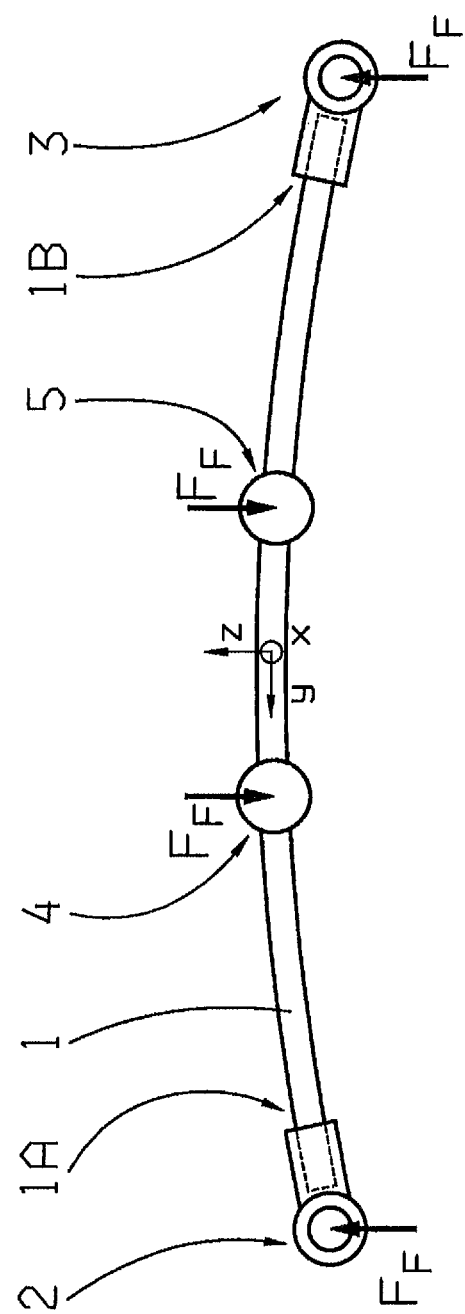
FIG. 1 a highly schematic representation of a transverse leaf spring having two outer guide bearings and two bearing mechanisms according to the invention, disposed in the center region of the transverse leaf spring.

FIG. 1 shows a highly schematic representation of a transverse leaf spring 1 that can be mounted in the region of a vehicle axle of a vehicle. The transverse leaf spring 1 is supported at the end regions 1A, 1B thereof facing toward wheels of the vehicle axle, in outer bearings 2, 3 or guide bearings, designed here as so-called bearing shoes, and connected to wheel carriers of the vehicle axle.

The transverse leaf spring 1 in the center region thereof is effectively connected, directly to a vehicle chassis or to an auxiliary frame connected in turn the vehicle chassis and supported thereon via bearing mechanisms 4, 5 acting as a central bearing. The bearing mechanisms 4 and 5 are disposed symmetrically about the center of the transverse leaf spring 1 and connect the mechanisms to the vehicle chassis in a manner described below, where rotations of the transverse leaf spring 1 in the region of the bearing mechanisms 4 and 5 are possible to the required extent during unidirectional and alternating spring actions such that different spring rates can be adjusted using the transverse leaf spring 1 with unidirectional and alternating deflections in the regions 1A and 1B.

The bearing mechanisms 4 and 5 have high bearing stiffness in the transverse direction of the vehicle, or respectively the y-direction, and during operation of a vehicle constructed with the transverse leaf spring 1 and the bearing mechanisms 4 and 5, deform only marginally in the y-direction, in order to take on wheel guiding tasks along with the described suspension function. The high bearing stiffness in the y-direction offers the additional possibility to avoid an overall shift of the transverse leaf spring 1 in the transverse direction of the vehicle, or respectively the y-direction, in a simple manner.

In order to create the frictional connection between the bearing mechanisms 4 and 5 and transverse leaf spring 1 necessary for the trouble-free function of the transverse leaf spring 1, the two bearing mechanisms 4 and 5 are also designed with a correspondingly high bearing stiffness in the vertical direction of the vehicle, or z-direction. Furthermore, due to the high bearing stiffness of the bearing mechanisms 4 and 5 in the vertical direction of the vehicle, the transverse leaf spring 1 does not have the shift of a rigid body in the region of the bearing mechanisms 4 and 5 during alternating deflection of the end regions 1A and 1B. During alternating deflection, the transverse leaf spring 1 is accordingly deformed in a targeted manner in a so-called S-stroke, and provides a higher alternating spring rate.

Figure 2:
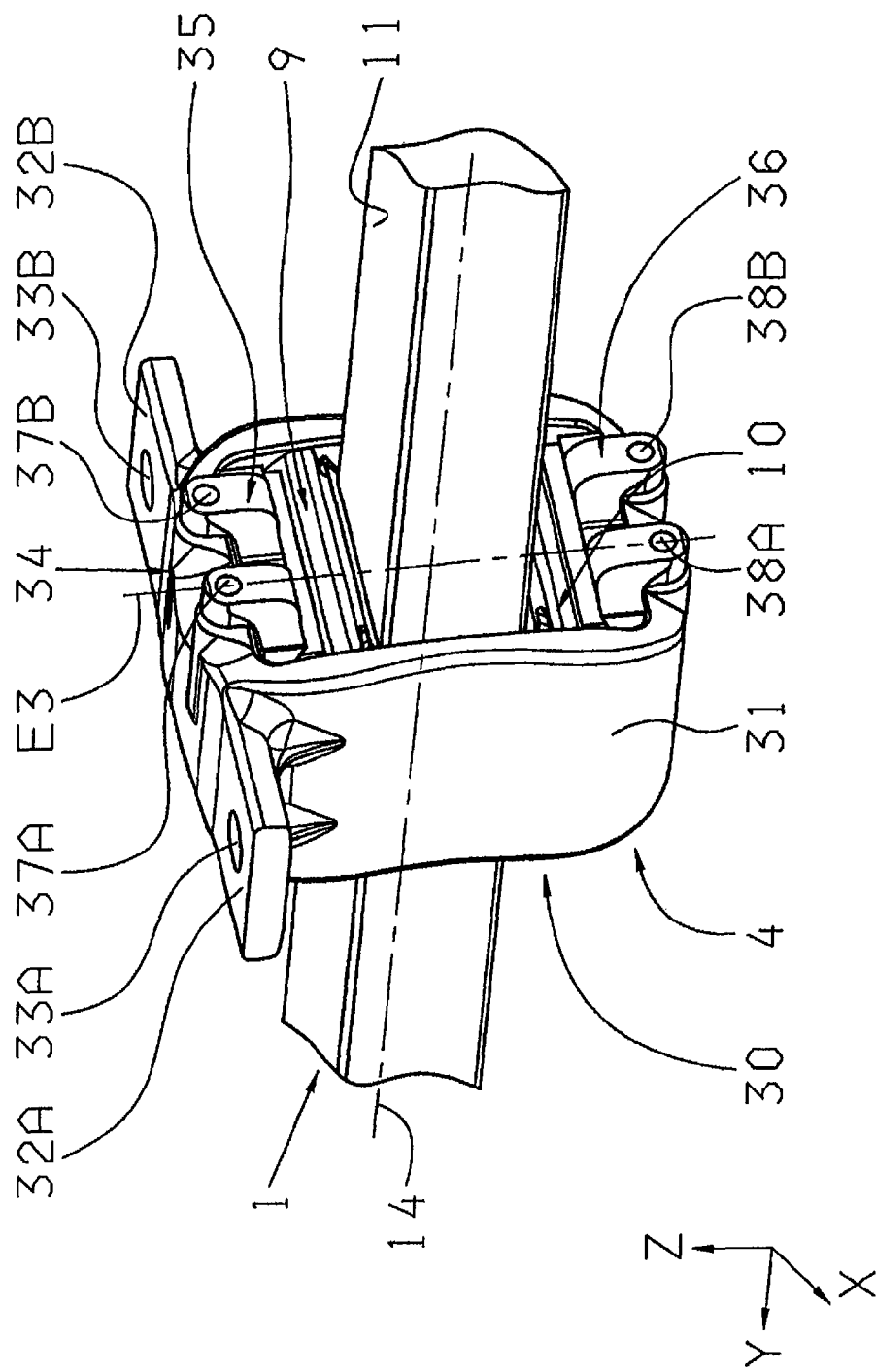
FIG. 2 a three-dimensional partial representation of the transverse leaf spring with a first embodiment of the bearing mechanism according to the invention, which is disposed in a center region of the transverse leaf spring.

FIG. 2 shows a three-dimensional partial representation of the transverse leaf spring 1 designed as a beam-like spring element. The transverse leaf spring 1 is connected to and supported at a vehicle chassis, not shown in more detail, by the two bearing mechanisms 4, 5, and connected via the two end region bearing mechanisms 2, 3 to the wheels of a vehicle axle of the vehicle, and supported in the end regions 1A, 1B. The so-called four point bearing allows both vertical suspension and roll suspension in the region of the transverse leaf spring 1, whereby conventional suspension springs and stabilizers known from the prior art are omitted. Along with the cited suspension functions, wheel guiding functions can also be provided by the transverse leaf spring 1 in a corresponding embodiment of the bearing mechanisms 4 and 5, and the end region bearings 2 and 3. Along with great cost savings potential, the present spring system also provides the possibility for weight reduction in the region of the vehicle axle due to appropriate selection of the material for producing the transverse leaf spring 1, for example fiber composite material.

Figure 3:
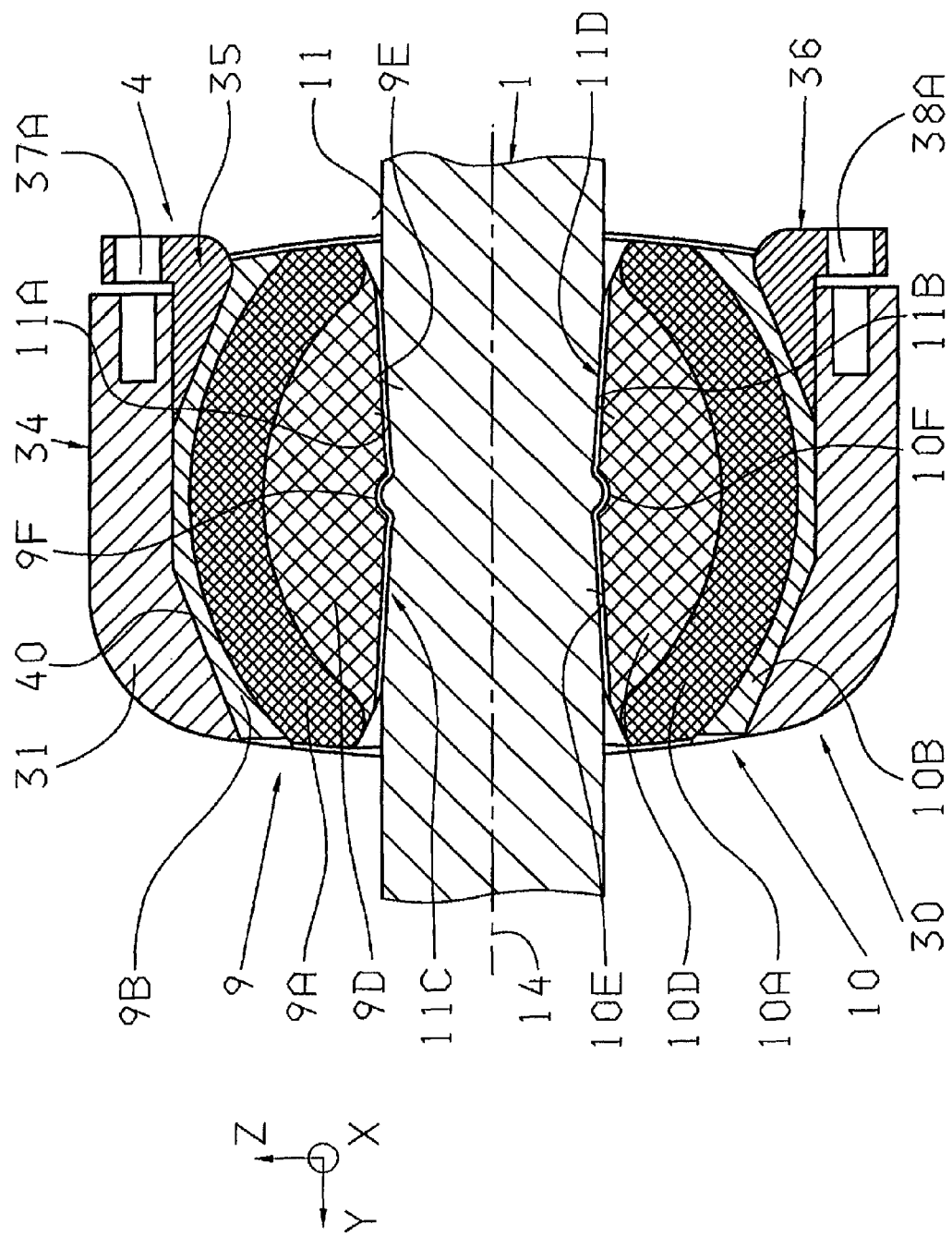
FIG. 3 the bearing mechanism according to FIG. 2 in a longitudinal section along the longitudinal sectional plane E3, shown in more detail in FIG. 2, that extends in the vertical and transverse direction of the vehicle.

FIG. 3 shows a longitudinal view of the bearing mechanism 4 along sectional plane E3, graphically depicted in greater detail in FIG. 2 only by a dash-dotted line, wherein the sectional plane E3 extends in the vertical direction z of the vehicle and in the transverse direction y of the vehicle and corresponds to a so-called yz-sectional plane.

The bearing mechanisms 4 and 5 fundamentally comprise the same construction, which is why the following description only describes the bearing mechanism 4 in greater detail.

The bearing mechanism 4 comprises an outer bearing shell device 30 having a one-piece bearing ring element 31 that is formed as a closed lateral part. With this, strong forces and torques can be transferred between the transverse leaf spring 1 and the vehicle chassis or an auxiliary frame, while simultaneously having a small construction space requirement. The bearing ring element 31 can be bolted together via two connecting devices 32A, 32B, in this case formed as connecting flanges and disposed with respect to the vertical axis z of the vehicle at the top of the bearing ring element 31, on the side of the vehicle chassis in the region of bolts 33A, 33B, and can be securely connected to the vehicle chassis or to an auxiliary frame coupled thereto. However, alternatively, it is possible to secure the bearing mechanism 4 on the vehicle chassis-side via another suitable fastening measures.

The bearing ring element is formed having a centering region 34 between the connecting flanges 33A, 33B that in the assembled state of the bearing mechanism 4 interacts with a vehicle chassis-side centering region and aligns the bearing mechanism 4 with respect to the vehicle chassis in the longitudinal direction x and transverse direction y of the vehicle. The centering region 34 is present as an elevation formed at the outside of the bearing ring element 31, proceeding in the transverse direction of the vehicle and formed having a rounded contour, and protruding in the vertical direction z of the vehicle, that engages in a corresponding recess in the vehicle chassis.

The transverse leaf spring 1 is completely encompassed by the bearing ring element 31, where insertion devices 9, 10 and an upper wedge-like tensioning element 35 and a lower tensioning element 36 are each disposed between a top of the transverse leaf spring 1 positioned in reference to the vertical direction z of the vehicle, and the bottom of the transverse leaf spring 1. The tensioning elements 35 and 36 are each slid in between the bearing ring element 31 and the insertion devices 9 or 10, in order to provide vertical pretensioning of the insertion devices 9 and 10 disposed between the bearing ring element 31 and the transverse leaf spring 1, and depending on the respective application case can be produced from metal, fiber composite and or purely composite material.

The upper tensioning element 35 is bolted in the region of bore holes 37A, 37B to the bearing ring element 31, whereas the lower tensioning element 36 is bolted in the region of bore holes 38A, 38B to the bearing ring element 31. Alternatively, however, there is the possibility to connect the tensioning elements 35, 36 each via only one bolt to the bearing ring element 31 or to provide another suitable type of connection.

The tensioning force generated by the tensioning elements 35 and 36 depending on the insertion path of the tensioning elements 35 and 36 into the bearing ring element 31, is supported in the region of the shoulder 40 of the bearing ring element 31.

In the present example embodiment, the tensioning elements 35 and 36 are each formed as separate components. In further advantageous embodiments it is possible to connect the tensioning elements to thin webs laterally encompassing the transverse leaf spring 1 to simplify an assembly, whereby a tensioning elements are formed as a hollow ring bodies that can be simply slid on or assembled on the transverse leaf spring. The tensioning elements are then formed elastically deformable in the region of the webs, in order to compensate expansions and compressions in the region of the webs created due to component tolerances and the like when the bearing pretensioning force is applied.

The insertion devices 9 and 10 here comprise two layer elements 9A, 9B or 10A 10B, and each has additionally an insertion part 9D or 10D formed substantially semi-cylindrically. The layer elements 9A and 10A of the insertion devices 9 and 10 are produced from a resilient material, which is applied during a vulcanization onto the metal layer elements 9B, or 10B and onto the insertion parts 9D and 10D that are presently similarly produced from metal, or which encompasses each of the layer elements 9B or 10B, as well as the insertion parts 9D or 10D at least in sections.

The insertion parts 9D and 10D can also be produced from plastic, fiber composite materials, natural materials, such as wood, stone and the like, as well as from different metal materials.

The layer elements 9B or 10B and the insertion parts 9D or 10D are each designed with greater stiffness than the layer elements 9A or 10A. Due to the stiffer embodiment of the insertion parts 9D and 10D, the service life of the bearing mechanism 4 is increased, and the bearing stiffness of the bearing mechanism 4 in the longitudinal direction x, transverse direction y and vertical direction z of the vehicle can be created higher than for bearing mechanisms without insertion parts.

However, alternatively to the described example embodiment it is also possible to design the insertion devices 9 and 10 without the bearing elements 9B and 10B designed with greater stiffness.

If the insertion parts 9D or 10D are formed with a resilient protective coating in the contact surfaces facing the transverse leaf spring 1, then a surface 11 of the transverse leaf spring 1 is sufficiently protected against damage in particular during oscillating loads, which can negatively impact the service life of the transverse the leaf spring to an undesired extent.

In addition, the protective coating can prevent fine dirt particles from penetrating between the insertion parts 9D and 10D and the transverse leaf spring 1. Here it is also conceivable that the insertion parts 9D and 10D are bonded to the surface 11 of the transverse leaf spring 1 for preventing the penetration of dirt particles, where this can be designed in the embodiment with or also without the protective coating.

Furthermore, due to a protective coating preferably implemented as a vulcanization coating of the insertion parts 9D and 10D, manufacturing tolerances in the region of the form-locking between the bearing mechanism 4 and the transverse leaf spring 1 can be compensated, and a coefficient of friction between the insertion parts 9D and 10D and the transverse leaf spring 1 can be increased by suitable material selection and corresponding surface characteristics of the protective coating.

Depending on the present application case, so-called thrust plates can be inserted in the layer elements 9A and 10A in order to be able to adjust the rotation stiffness about the bearing axis, which corresponds to the vehicle longitudinal axis x, in a suitable ratio to the vertical stiffness. Due to the additional thrust plate a relatively low torsional stiffnesses can be adjusted even at high vertical stiffness.

The insertion devices 9 and 10 are formed in the contact surfaces 9E and 10E that are facing the support surfaces 11A and 11B of the transverse leaf spring 1, with each having at least one receiving device 9F or 10F, into which in the assembled state of the insertion devices 9 and 10 a region 1C or 1D of the transverse leaf spring 1 engages in a form-locking manner. Additionally, in the vertical direction of the vehicle z, the transverse leaf spring 1 in the region of the support surfaces 11A and 11B, comprises recesses 11C, 11D each for the insertion devices 9 or 10, and into which the insertion devices 9 and 10 engage in a form-locking manner via correspondingly shaped insertion parts 9D and 10D, so that during operation of a vehicle relative movement of the transverse leaf spring 1 in the transverse direction of the vehicle y with respect to the vehicle chassis, is avoided in a constructively simple manner and also via additional form-locking between the transverse leaf spring 1 and the bearing mechanism 4 in addition due to the force locking connection to the bearing mechanism 1.

The recesses 11C and 11D, or the contours of the recesses 11C and 11D, are formed such that during operation stress is distributed as a uniformly as possible in a contact region of the bearing mechanism 4 at transverse leaf spring 1 which favorably influences the service life of the transverse leaf spring 1. The contour of the recesses 11C and 11D each substantially correspond to a special cosinusoidal indentation in the y-direction, thereby attaining a stress distribution that is as uniform as possible in the bearing region of the transverse leaf spring 1.

The transverse leaf spring 1, in the region of the surface 11 thereof, is implemented at least in the contact region to the bearing mechanisms 4 and 5 having a special surface coating or surface treatment, in order to increase the hardness of the surface 11 of the transverse leaf spring 1 with respect to the remaining surface 11, and to provide a larger coefficient of friction compared to the untreated state for increasing the connection forces in the region of the form-locking between the transverse leaf spring 1 and the bearing mechanism 4 and 5. Additionally it is possible to use a special surface coating or surface treatment of the surface 11 of the transverse leaf spring 1 in order to facilitate or simplify the manufacturing process for producing the regions 1C and 1D of the transverse leaf spring 1, for instance the process of demolding the transverse leaf spring 1 from the tool.

For example, an adhesive layer, a varnish layer, a plastic material and a plastic layer implemented with nanoparticles, are conceivable as a surface coating. During a surface treatment, the surface 11 of the transverse leaf spring 1 is pre-treated with a fluid increasing the adhesion property of the surface for example, and then particles increasing the hardness or the coefficient of friction are applied onto the surface of the transverse leaf spring in the cited region, for example by vapor deposition.

In the assembled state of the bearing mechanism 4 and 5, the center of rotation of the two insertion devices 9 and 10 lies substantially on the neutral fiber 14 of the transverse leaf spring 1, whereby deformations in the region of the insertion devices 9 and 10 are advantageously of substantially uniform extent. The recesses 11C and 11D of the transverse leaf spring 1, which are preferably cosinusoidal the transverse direction of the vehicle, provide a form-locking connection of the bearing mechanism 4 to the transverse leaf spring 1, where the cosinusoidal form, or the cosinusoidal transition between the surface 11 of the transverse leaf spring 1 outside of the recesses 11C and 11D and the support surfaces 11A and 11B in the region of the recesses 11C and 11D guarantees a transition that is as smooth as possible in the progression of the individual fibers of the transverse leaf spring 1 produced from composite material. The smooth transition in the progression of fibers of the transverse leaf spring 1 prevents adverse influence to the service life of the transverse leaf spring 1 in a simple manner.

FIG. 4 to FIG. 12b show further advantageous example embodiments of the bearing mechanism 4 according to the invention, which mainly differ only in partial regions from the example embodiment of the bearing mechanism 4 shown in FIG. 2 and FIG. 3, which is why in the following description for FIG. 4 to FIG. 12b only the differences are described, and for the remaining function for the following example embodiments of the bearing mechanism 4 reference is made to the description for FIG. 2 and FIG. 3. The tensioning elements of the following example embodiments of the bearing mechanism 4 can be formed as described above as one-piece or multi-piece, depending on the present application case.

Figure 4:
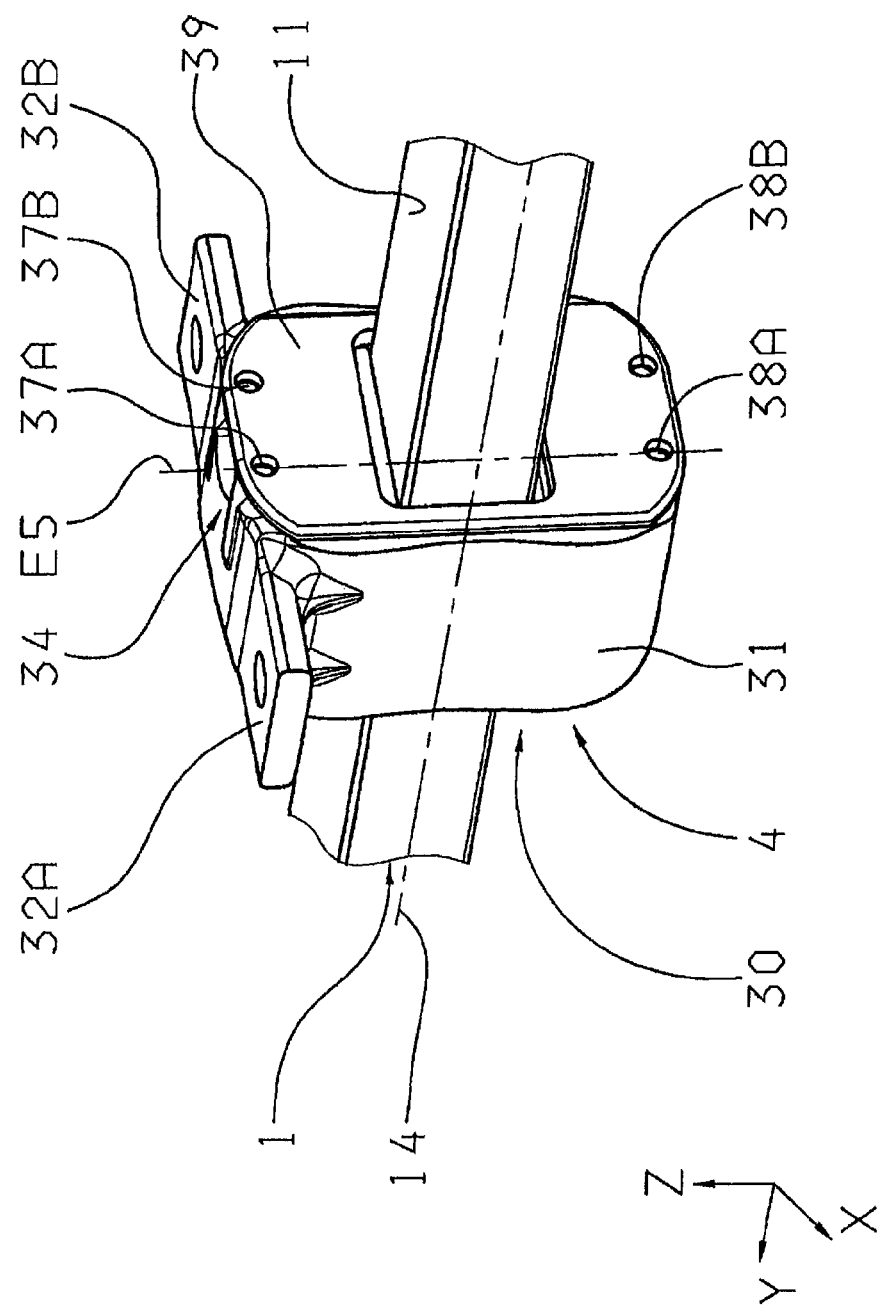
FIG. 4 a representation according to FIG. 2 of a second embodiment of the bearing mechanism according to the invention.

In the example embodiment shown in FIG. 4, the pretensioning force required for representing a desired bearing function of the bearing mechanism 4 is made available via the tensioning elements 35A, 35B and 36A, 36B, formed as a hollow cylinder and in segments, where the pretensioning force of the bearing mechanism 4 is created via a plate 39 that can be securely connected to the bearing ring element 31 preferably via a bolted connection.

In the assembled state of the cover plate 39, a tensioning elements 35B and 36B are increasingly slid in between the bearing ring element 31 and the insertion devices 9 and 10. The pretensioning force generated by the tensioning elements 35B and 36B is introduced into the tensioning elements 35A, 36A via the insertion devices 9 and 10, and supported in the region of the shoulder 40 and the transverse leaf spring 1.

As an alternative to the described bolted connection, depending on each application case, the cover plate 39 can also be connected to the bearing ring element to the desired extent via another suitable type of connection, for instance rivets, flanging or the like.

Figure 5:
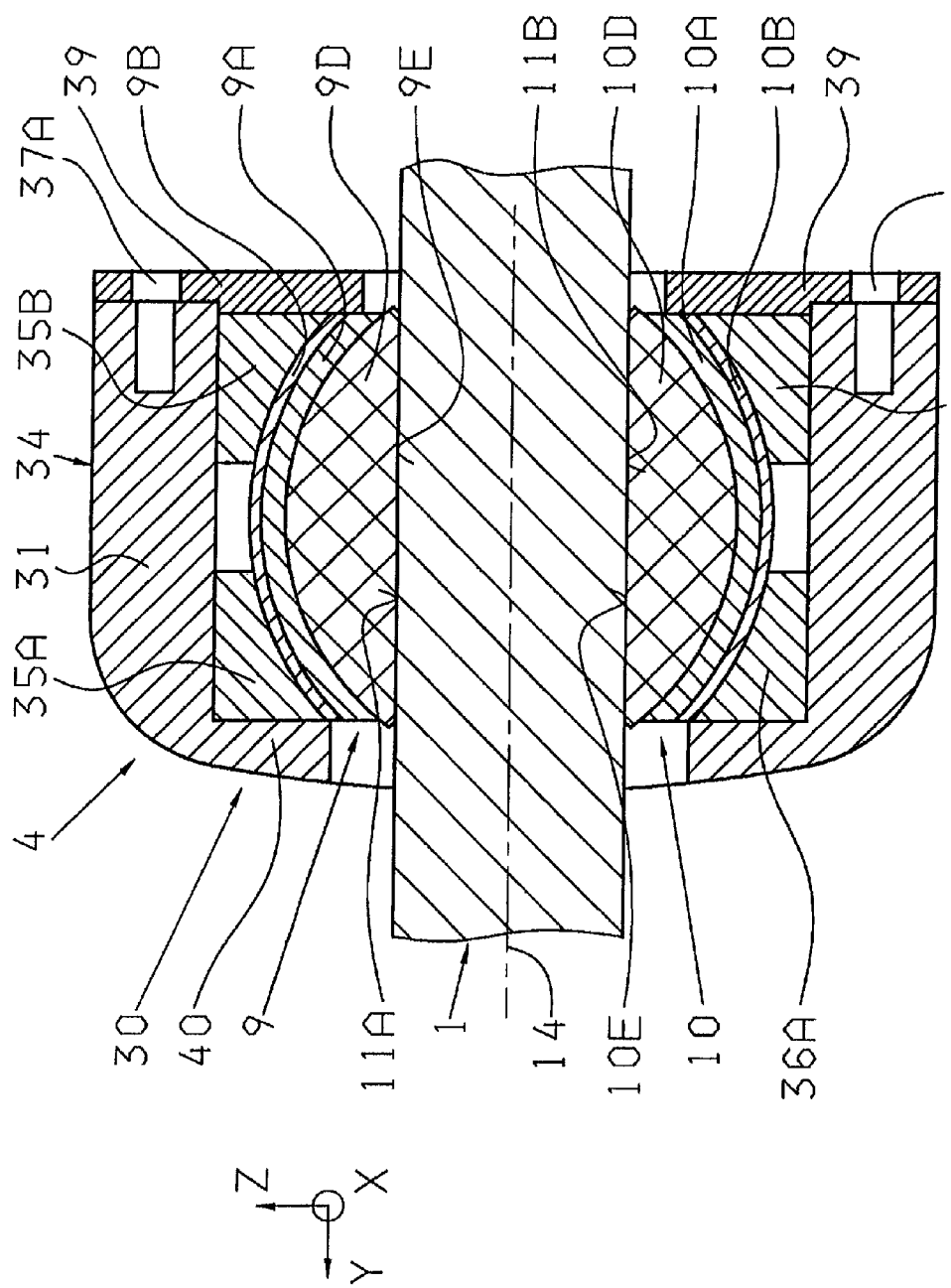
FIG. 5 a representation according to FIG. 3 of the bearing mechanism according to FIG. 4 in a longitudinal sectional view along a longitudinal sectional plane E5 shown in more detail in FIG. 4, that is oriented both in the vertical and transverse direction of the vehicle.

In the second example embodiment of the bearing mechanism 4 represented in FIG. 4 and FIG. 5, there is no additional form-locking in the region between the insertion parts 9D and 10D and the transverse leaf spring 1, as was the case with the bearing mechanism 4 according to FIG. 2 and FIG. 3. This also holds for the further example embodiments of the bearing mechanism 4 represented in FIG. 6 to FIG. 12b. It lies within the discretion of the person skilled in the art to form the further example embodiments of the bearing mechanism 4 depicted in the drawing also with a form-locking connection in the region between the insertion devices 9 and 10 and the transverse leaf spring 1.

Figure 6:
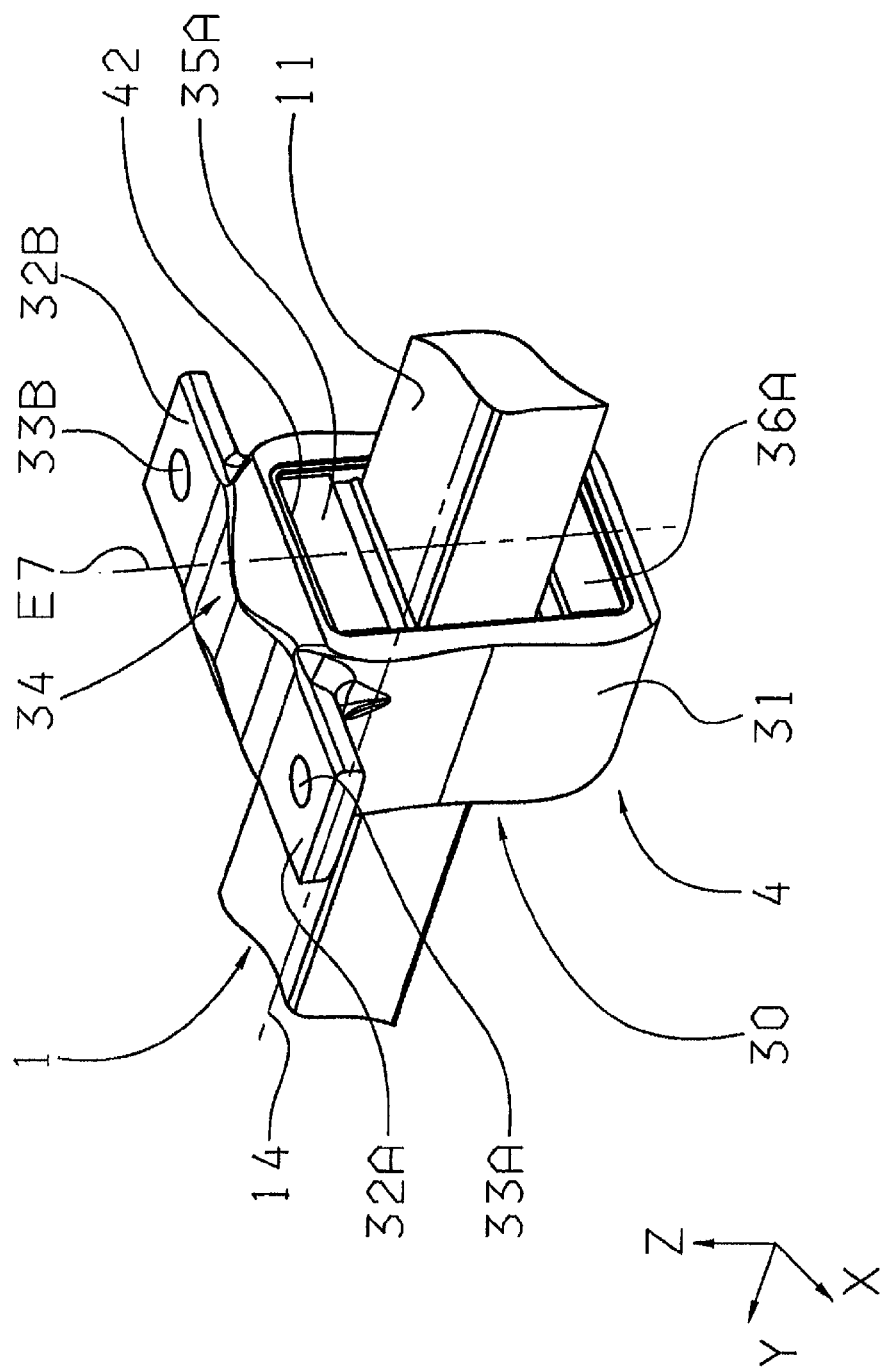
FIG. 6 a representation according to FIG. 2 of a third embodiment of the bearing mechanism according to the invention.
Figure 7:
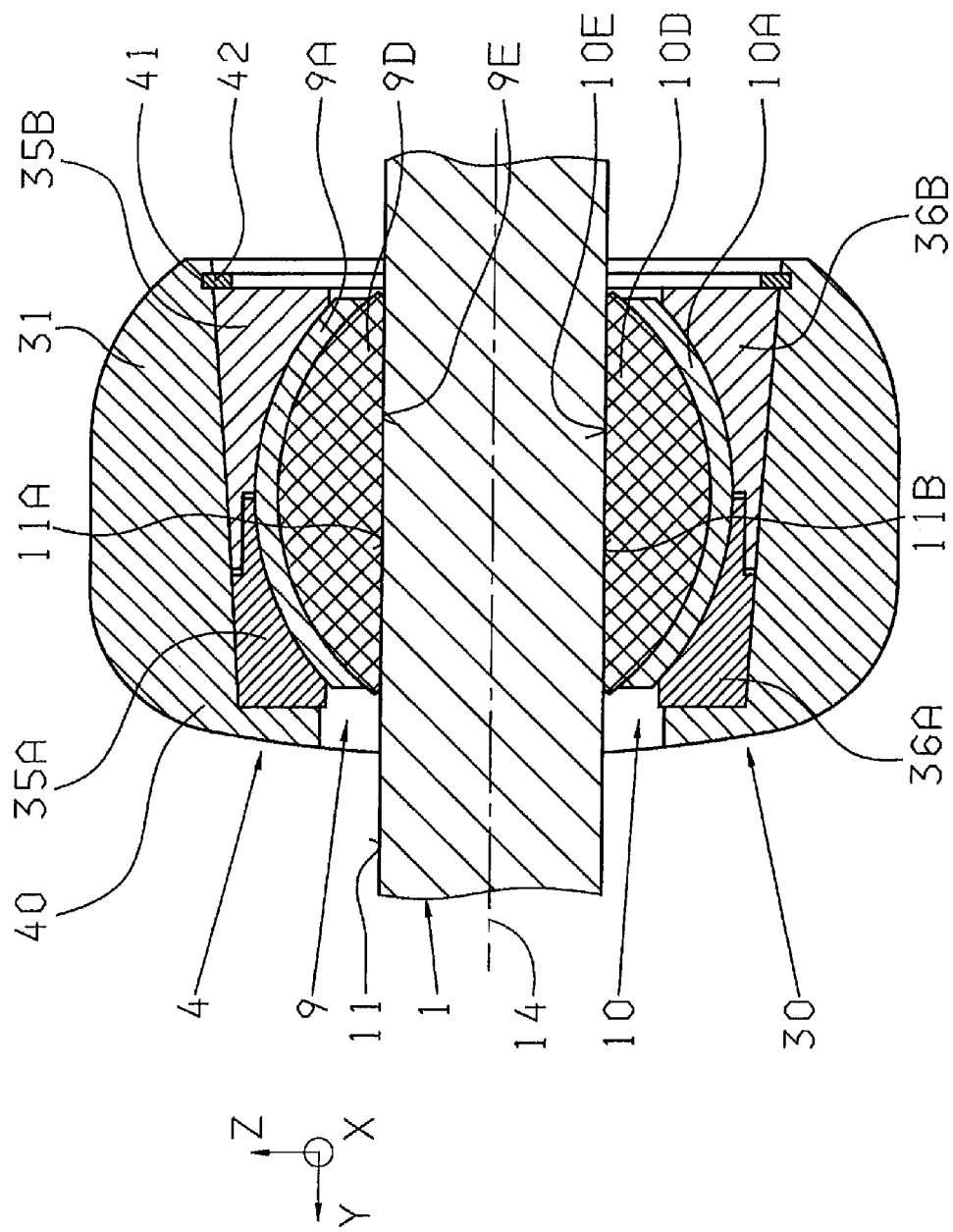
FIG. 7 a longitudinal sectional view according to FIG. 3 of the bearing mechanism according to FIG. 6, along a longitudinal sectional plane E7 shown in more detail in FIG. 6, which extends both in the vertical and transverse direction of the vehicle.

In the third example embodiment of the bearing mechanism 4 represented in FIG. 6 and FIG. 7, the tensioning elements 35A 35B, and 36A, 36B are held in the pre-tensioning position thereof applying the pretensioning force via a locking ring 42 disposed in a groove 41 of the bearing ring element 31. In contrast to the second example embodiment of the bearing mechanism 4, the tensioning elements 35A, 35B and 36A, 36B overlap in the transverse direction y of the vehicle and in the vertical direction of the vehicle, in order to guarantee a particularly good force transfer between the vehicle chassis and the transverse leaf spring 1.

Figure 8:
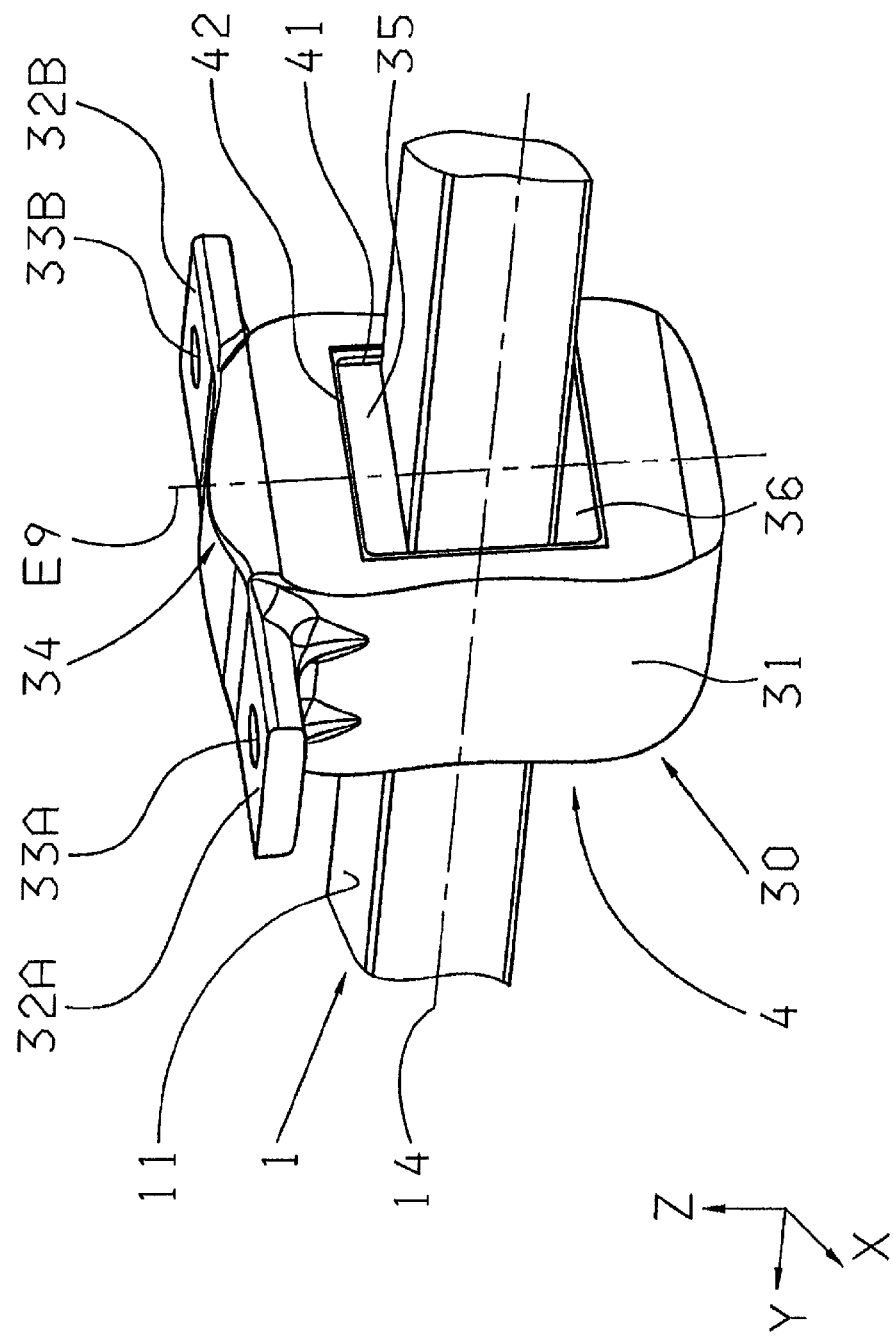
FIG. 8 a representation according to FIG. 2 of a further example embodiment of the bearing mechanism according to the invention.
Figure 9:
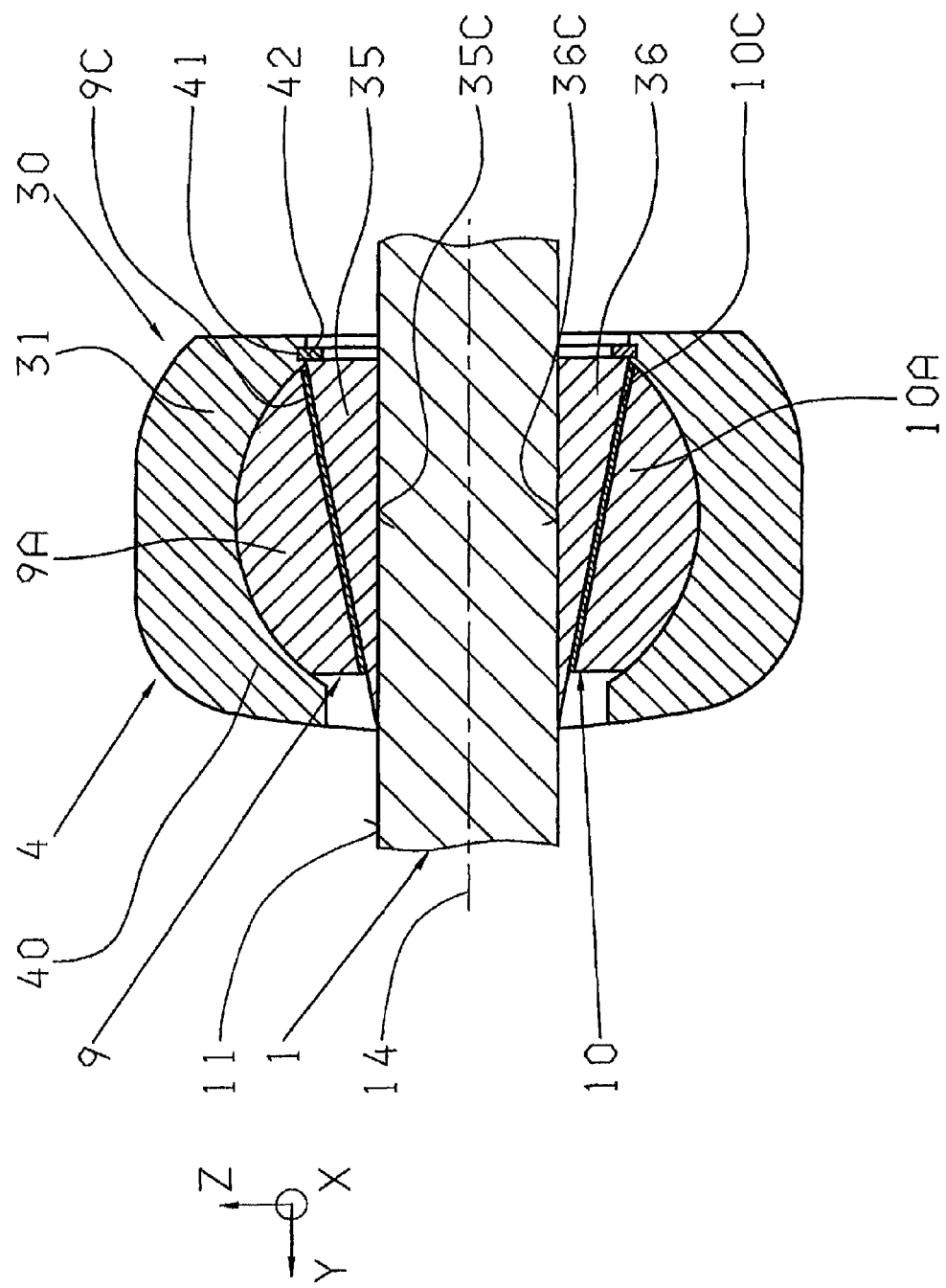
FIG. 9 a longitudinal sectional view corresponding to FIG. 3 of the bearing mechanism according to FIG. 8 along a sectional plane E9 extending in the vertical and transverse direction of the vehicle.

FIG. 8 and FIG. 9 show a fourth example embodiment of the bearing mechanism 4 in which the tensioning elements 35 and 36 are each positioned between further layer elements 9C and 10C and the surface 11 of the transverse leaf spring 1, which can be produced from metal, fiber composite plastic material or a purely plastic material, and are represented here as separate components, where the further layer elements 9C and 10C can also be formed as one-piece. The further layer elements 9C and 10C are formed with greater stiffness than the resilient layer elements 9A and 10A, and are disposed between the resilient layer elements 9A and 10A and the tensioning elements 35, 36. The wedge-shaped tensioning elements 35 and 36 of the bearing mechanism 4 according to FIG. 8 and FIG. 9 extend over the entire bearing width between the further layer elements 9C and 10C and the transverse leaf spring 1.

The additional layer elements 9C and 10C offer the possibility to introduce the pretensioning force from the tensioning elements 35 and 36 into the resilient layer elements 9A and 10A as uniformly as possible and in a simple manner, particularly during tipping movements of the transverse leaf spring 1 in the region of the bearing mechanism 4. Furthermore, depending on the application case, the further layer elements 9C and 10C can be connected to the layer elements 9A and 10A using vulcanization, and provide a simple manner to prevent the tensioning elements 35 and 36 from damaging the resilient layer elements 9A and 10A during the assembly of the bearing mechanism 4.

The tensioning elements 35 and 36 are held in the pretensioning position thereof via the locking ring 42. In order to avoid undesired self-actuated locking of the tensioning elements 35 and 36 after the assembly of the bearing mechanism 4, the tensioning elements are formed with a surface coating increasing the coefficient of friction in surface regions 350, 36C assigned to the surface 11 of the transverse leaf spring 1. Alternatively, it is possible to form the surface 11 of the transverse leaf spring 1 in the contact region with the tensioning elements 35 and 36 having a coating increasing the coefficient of friction, or a specific surface profile shown for example in FIG. 12a and FIG. 12b, which prevents the loosening of the tensioning elements 35 and 36.

Figure 10:
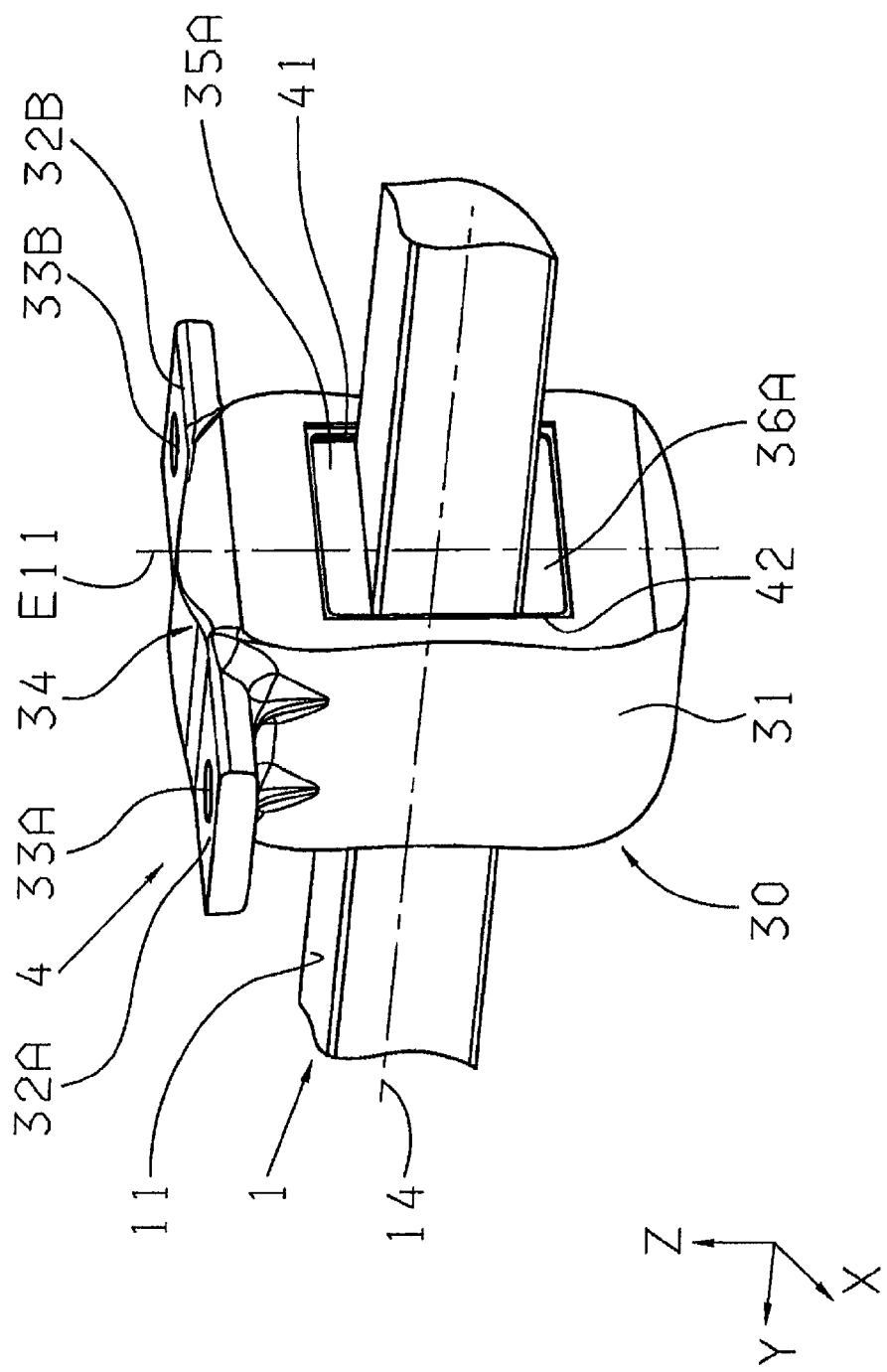
FIG. 10 a representation according to FIG. 2 of a fifth example embodiment of the bearing mechanism according to the invention.
Figure 11:
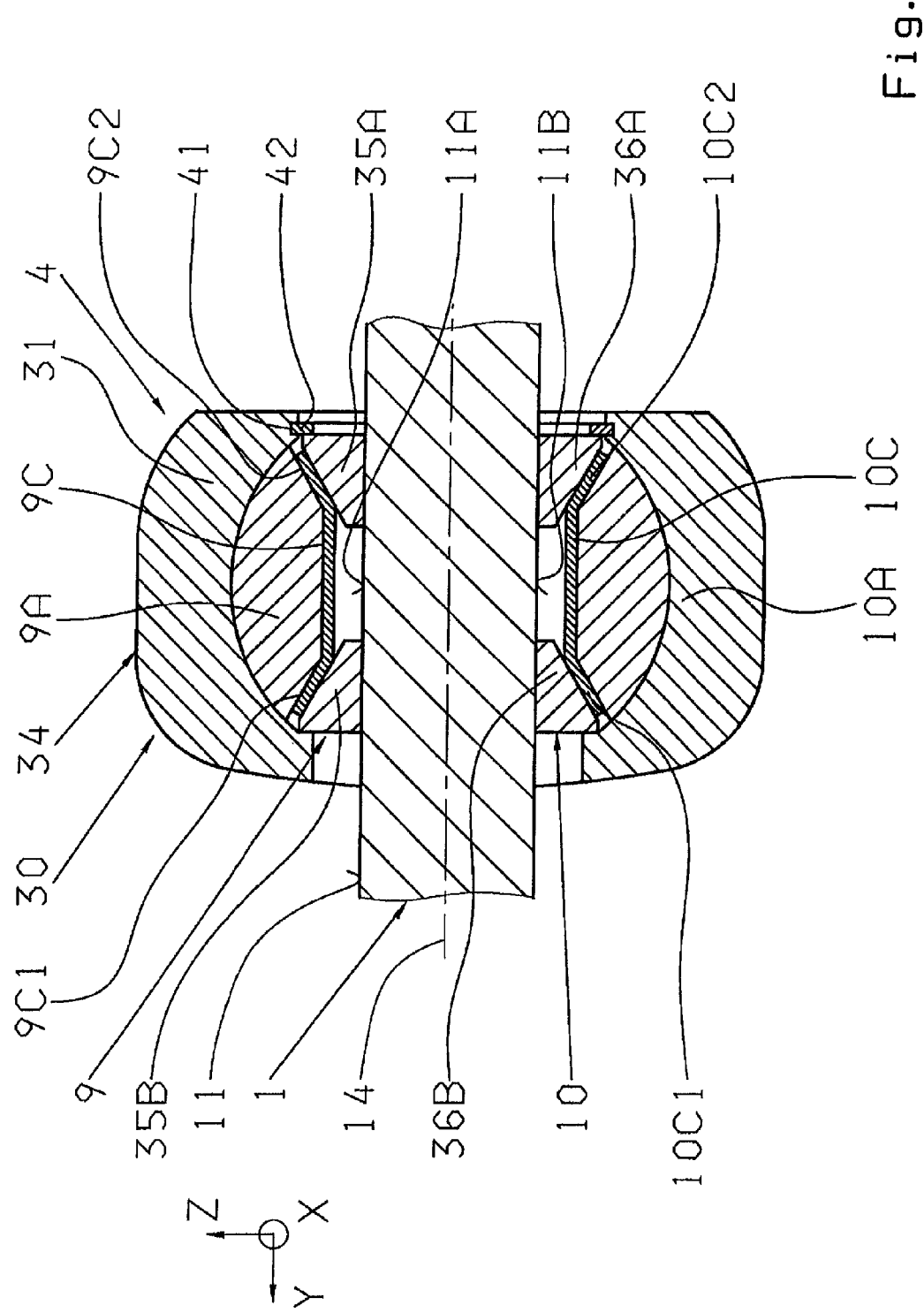
FIG. 11 a representation according to FIG. 3 of the bearing mechanism according to FIG. 10 along a sectional plane E11 extending in the vertical and transverse direction of the vehicle.

A fifth example embodiment of the bearing mechanism 4 is shown in FIG. 10 and FIG. 11, in which the bearing mechanism 4 comprises a similar construction to the bearing mechanism 4 according to FIG. 8 and FIG. 9, however in a symmetrical design. The pretensioning force is again generated in each case via wedge-shape tensioning elements 35A, 35B and 36A, 36B, which are disposed between the surface of the transverse leaf spring 1 and the further layer elements 9C and 10C and the resilient layer elements 9A and 10A.

The further layer elements 9C and 10C are formed having substantially planar central regions and angled end regions 9C1, 9C2, 10C, 10C2, in each case adapted to the inclines of the tensioning elements 35A, 35B and 36A, 36B, where the layer elements 9A and 10A in the contact region thereof with the further layer elements 9C and 10C are each adapted to the shape of the layer elements 9C and 10C. On the sides of the layer element facing away from the transverse leaf spring 1, the resilient layer elements 9A and 10A are applied directly onto the bearing ring element 31.

Figure 12B:
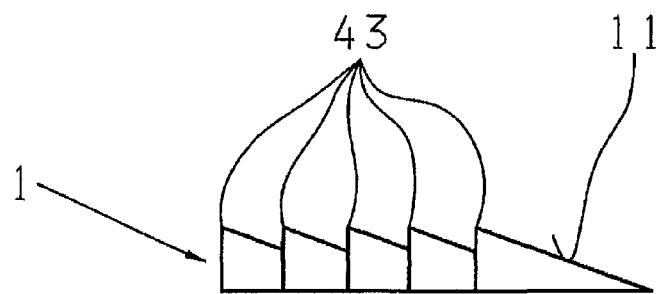
Figure 12A:
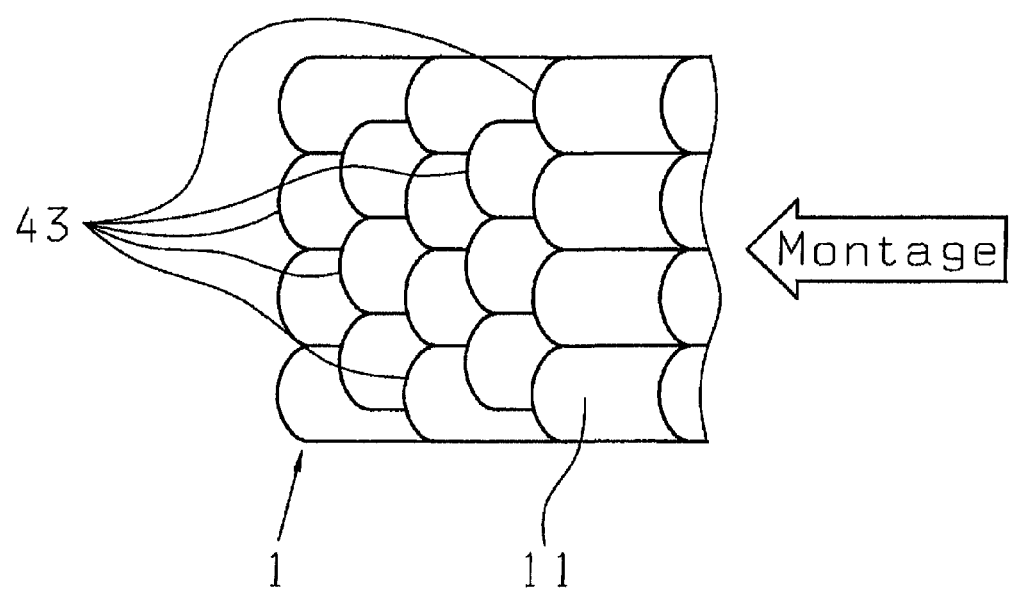
FIG. 12a an enlarged schematic partial individual view of a defined top surface region of a tensioning element of the bearing mechanism according to the invention.

FIG. 12a and FIG. 12b show a preferred embodiment of the surface 11 of the transverse leaf spring 1 according to FIG. 8 or according to FIG. 10 in the contact region of the tensioning elements 35 and 36 or 35A, 35B, and 36A, 36B, by means of which the tensioning elements are prevented in a simple manner from slipping back out of their pretensioned position after the assembly. The arrow in FIG. 12a graphically represents the assembly direction of the tensioning elements. Because the sawtooth-like fish scale profile supports guiding the tensioning element over the surface 11 of the transverse leaf spring in the assembly direction, the assembly of the bearing mechanism 4 is not made more difficult by the surface profile of the transverse leaf spring 1. After assembly, the tips 43 effectively prevent the tensioning elements from slipping backwards.

Figure 13:
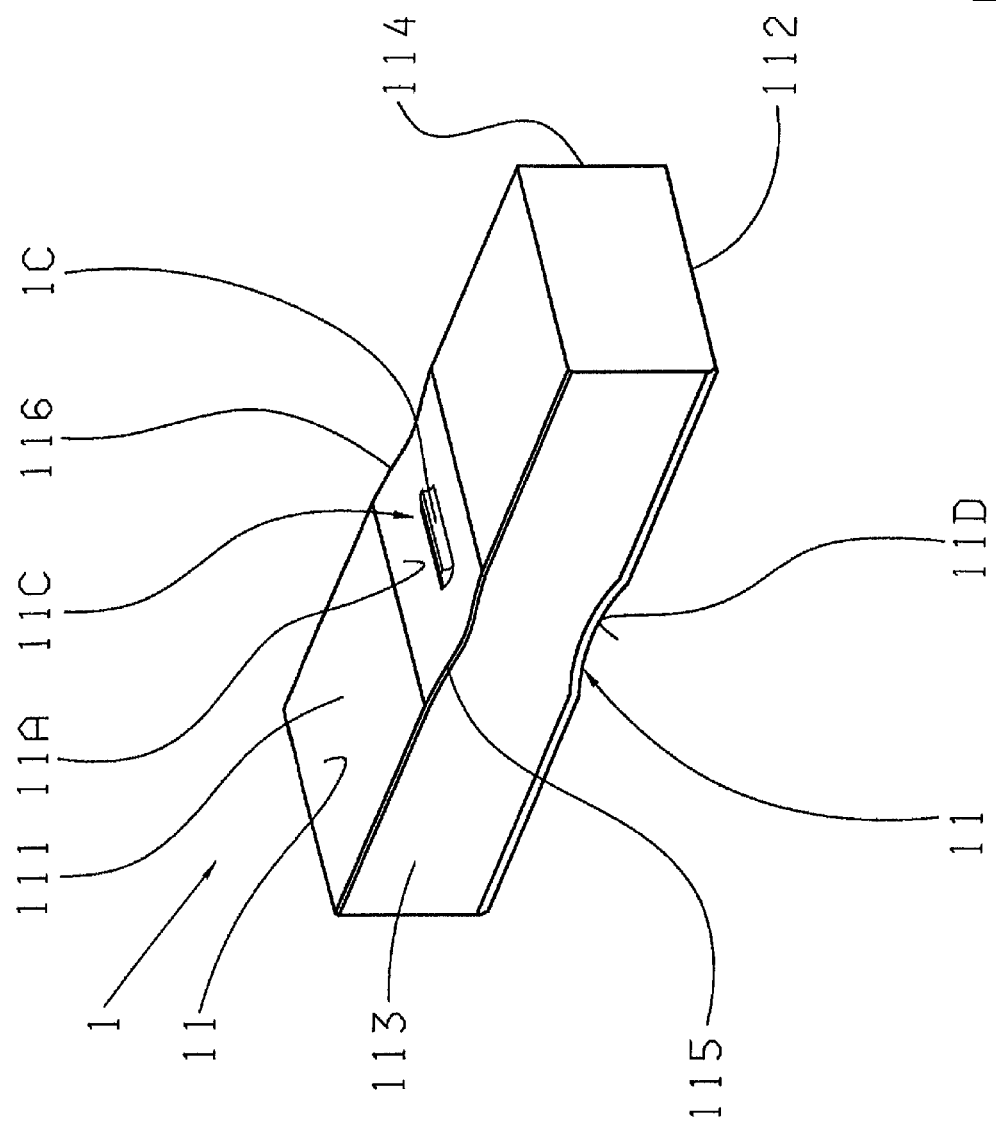
FIG. 13 to FIG. 21 each, a partial view of different embodiments of the transverse leaf spring in an assembly region of the bearing mechanism according to the invention.

FIG. 13 to FIG. 21 show embodiments of the regions of the transverse leaf spring 1 producing the form-locking between transverse leaf spring 1 and the bearing mechanism 4. The embodiments represented in FIG. 13 to FIG. 21 differ only in partial regions, which is why in the following description only the differences between the individual embodiment are described, and the description of FIG. 13 is referenced regarding the further functionality of the recesses.

FIG. 13 to FIG. 21 show embodiments of the regions of the transverse leaf spring 1 producing the form-locking between transverse leaf spring 1 and the bearing mechanism 4. The embodiments represented in FIG. 13 to FIG. 21 differ only in partial regions, which is why in the following description only the differences between the individual embodiment are described, and the description of FIG. 13 is referenced regarding the further functionality of the recesses.

In the embodiment represented in FIG. 13, the transverse leaf spring 1 is strongly compressed in the vertical direction of the vehicle, or in the z-direction, and formed with the same width as in the remaining cross-sectional region of the transverse leaf spring 1. Thereby the compressed region, or the region of the recesses 11C and 11D of the transverse leaf spring 1, have an increased portion of fibers. Due to the recesses 11C and 11D, increased transverse forces acting in the region of the bearing mechanism 4 can be reliably introduced from the transverse leaf spring 1 into the bearing mechanism 4. The transition between the recesses 11C and 11D and the adjacent surface 11 of the transverse leaf spring 1 is formed optimized for stress via a cosine contour having tangential starting and ending shapes so that during operation only minor stress increases occur in the region of the recesses 11C and 11D.

The regions 1C and 1D of the transverse leaf spring 1 substantially take on the task of centering the bearing mechanism 4 on the transverse leaf spring 1 in the longitudinal and transverse direction, while the regions 1C and 1D are mainly not involved, or only to a small extent, in the transmission of force between the bearing mechanism 4 and the transverse leaf spring 1. The shapes of the regions 1C and 1D are each designed with smooth transitions to the recesses 11C and 11D, wherein mainly resin enters in the regions 1C and 1D during production of the transverse leaf spring. Due to this manner of processing, an abrupt redirection of the fiber in the cross-section of the transverse leaf spring 1 is avoided.

Figure 14:
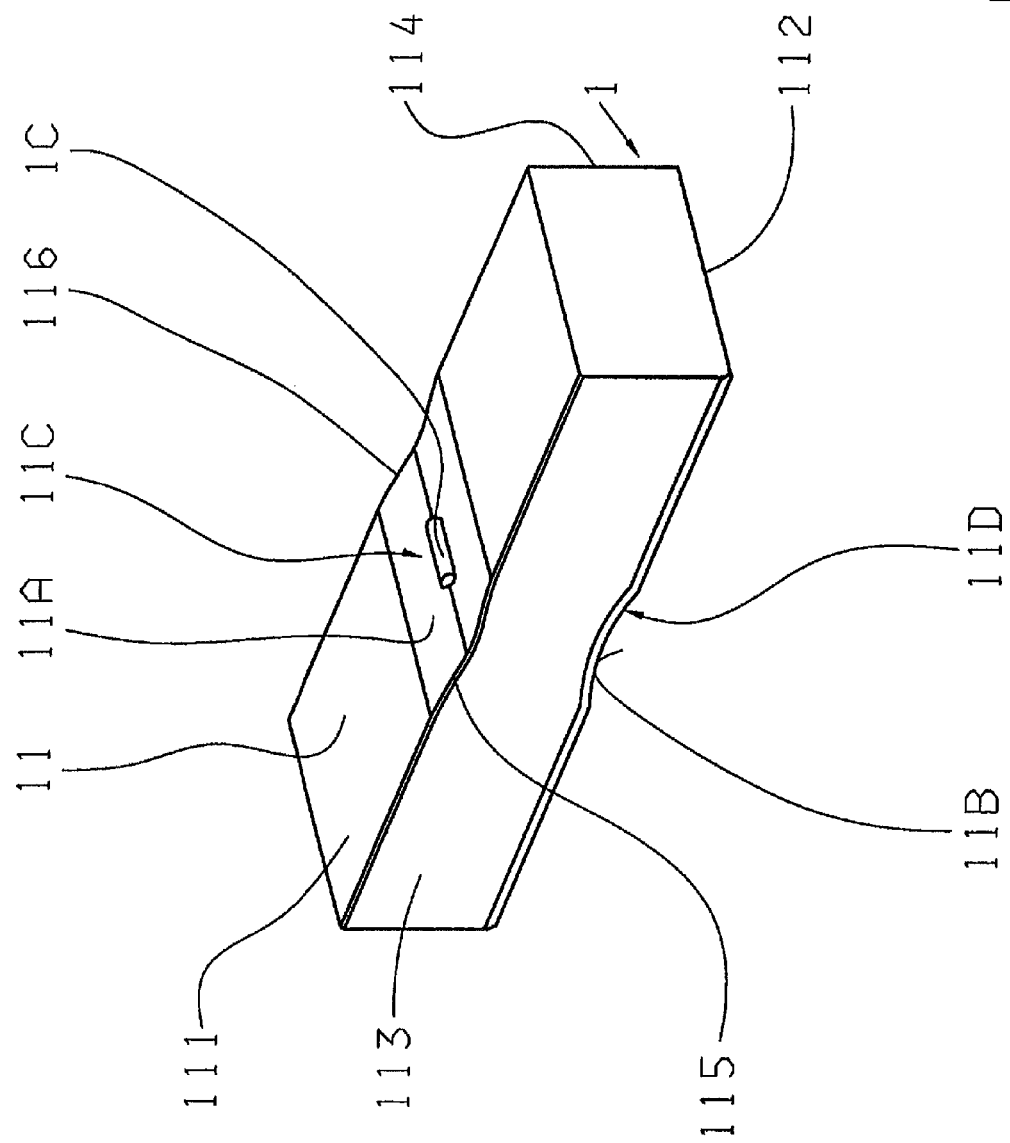

In the embodiment of the transverse leaf spring 1 represented in FIG. 14, the regions 1C and 1D are designed with a transition to the recesses 11C and 11D that is less smooth, and having an outer shape that is substantially nearly semi-cylindrical. Compared to the shape of the regions 1C and 1D represented in FIG. 13, the semi-cylindrical outer shape facilitates a simpler production of the tool which is used for manufacturing the transverse leaf spring 1. The regions 1C and 1D of the example embodiment of the transverse leaf spring 1 represented in FIG. 14, substantially take on only the centering of the bearing mechanism 4 at the transverse leaf spring 1 in the longitudinal and transverse direction, and are not involved, or only minimally involved, in the transmission of forces between the bearing mechanism 4 and the transverse leaf spring 1. The shapes of the regions 1C and 1D are designed such that the fibers of the transverse leaf spring 1 do not have any substantial redirection, and that the stiffness of the transverse leaf spring 1 corresponds to the stiffness of transverse leaf springs designed without the regions 1C and 1D.

Figure 15:
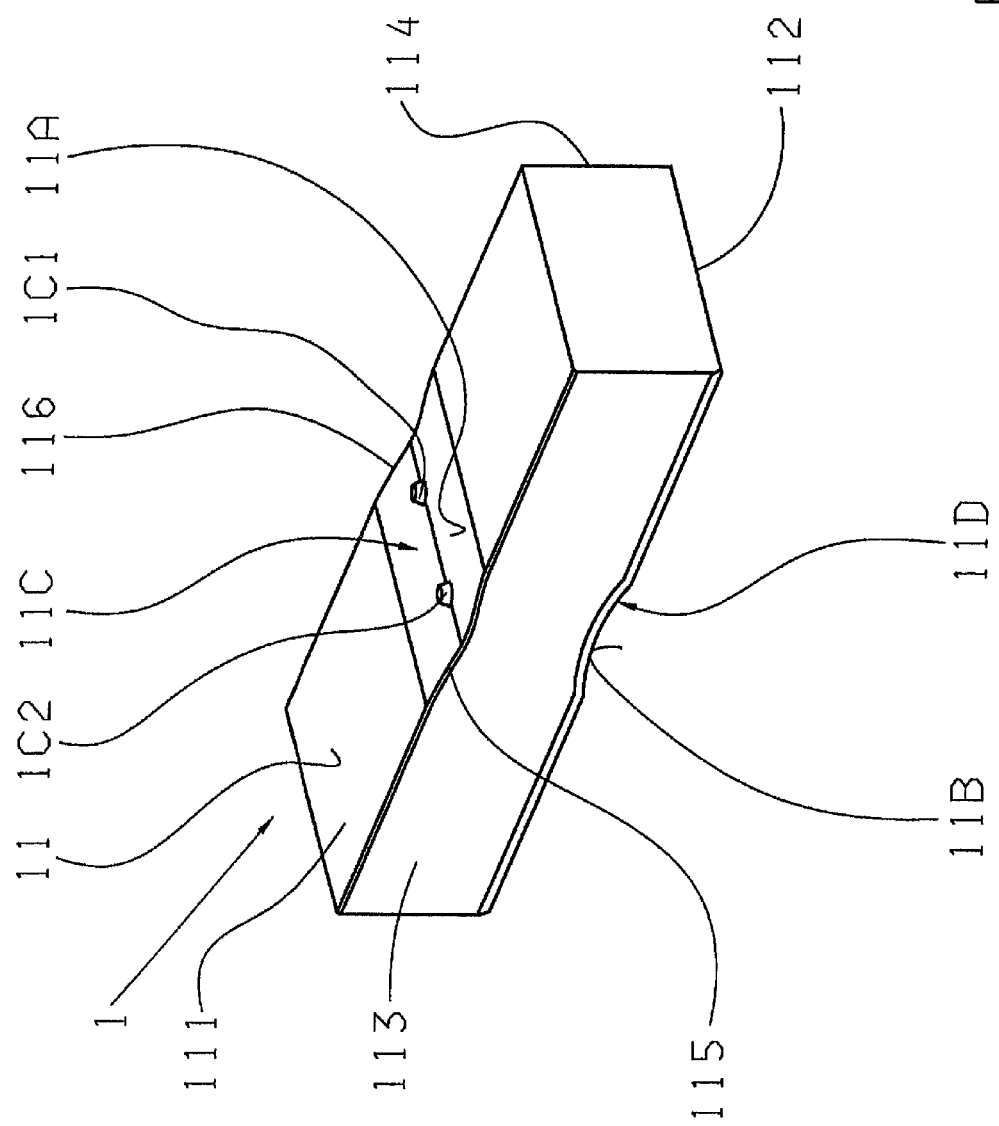

In the example embodiment of the regions 1C and 1D shown in FIG. 15, these regions are formed having two noses designed at least approximately in the shape of a truncated cone, disposed in the regions of the outer sides of the transverse leaf spring, and using these noses the bearing mechanism 4 is centered on the transverse leaf spring 1. The regions 1C and 1D again essentially accumulate resin in order to prevent abrupt redirection of the fibers in the region of the recesses or the regions 1C and 1D.

Figure 16:
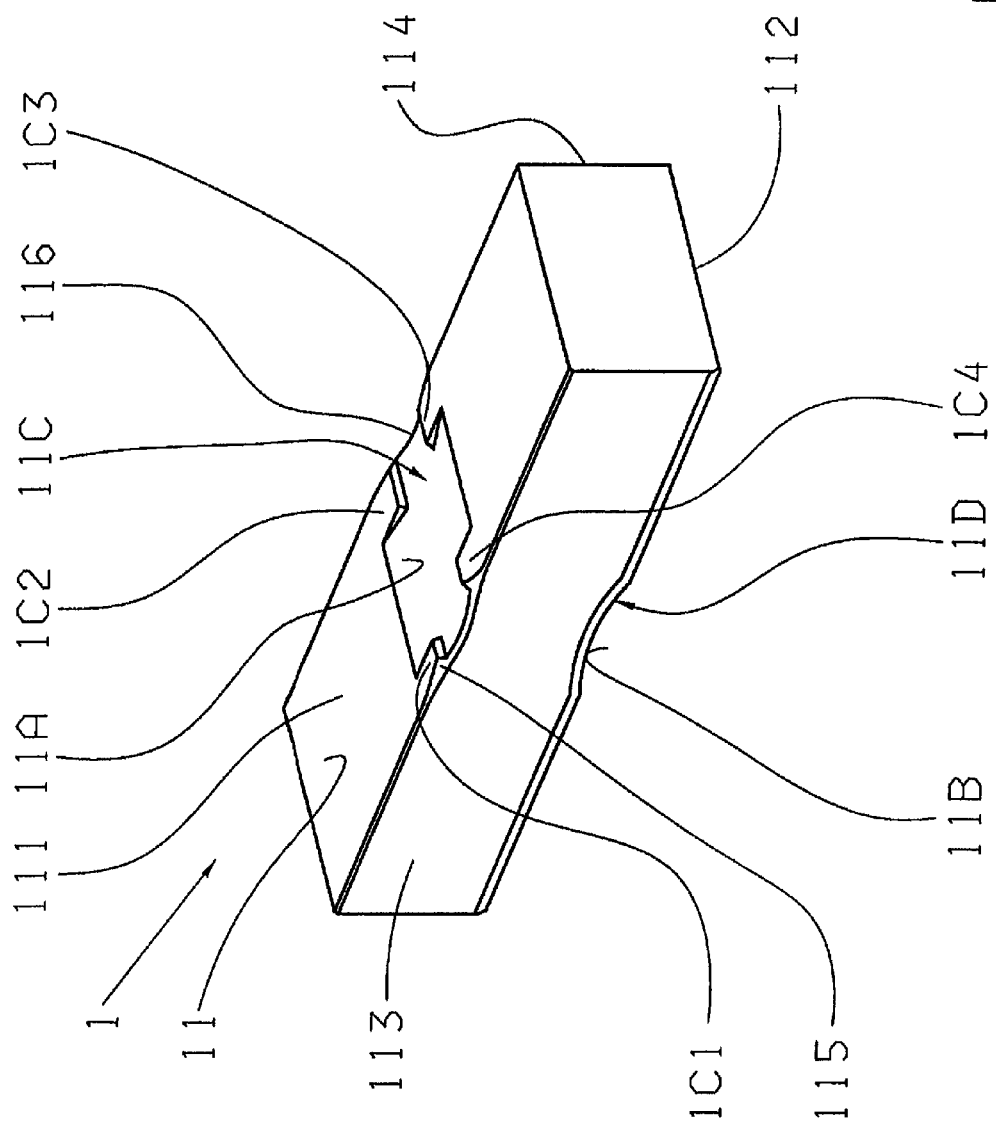
Figure 17:
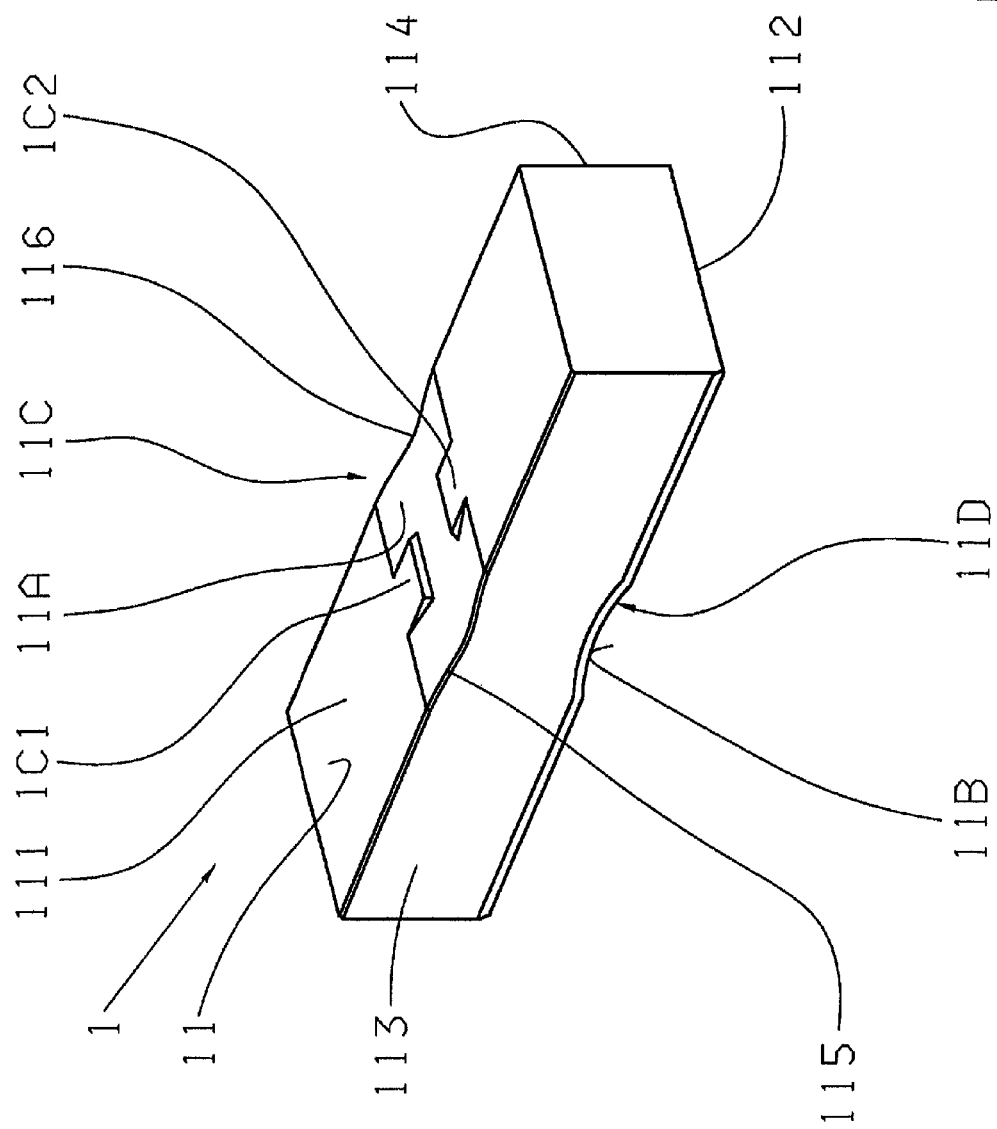

In the further example embodiment of the transverse leaf spring 1 according to FIG. 16, the regions 1C and 1D are formed as noses 1C1 to 1C4, disposed in the region of the outer sides of the transverse leaf spring 1, where the transitions between the recesses 11C and 11D and the noses 1C1 to 1C4 are formed again optimized for stress. In the example embodiment of the transverse leaf spring 1 according to FIG. 17, the regions 1C and 1D are formed with noses 1C1 and 1C2 disposed in the center region of the transverse leaf spring 1.

Figure 18:
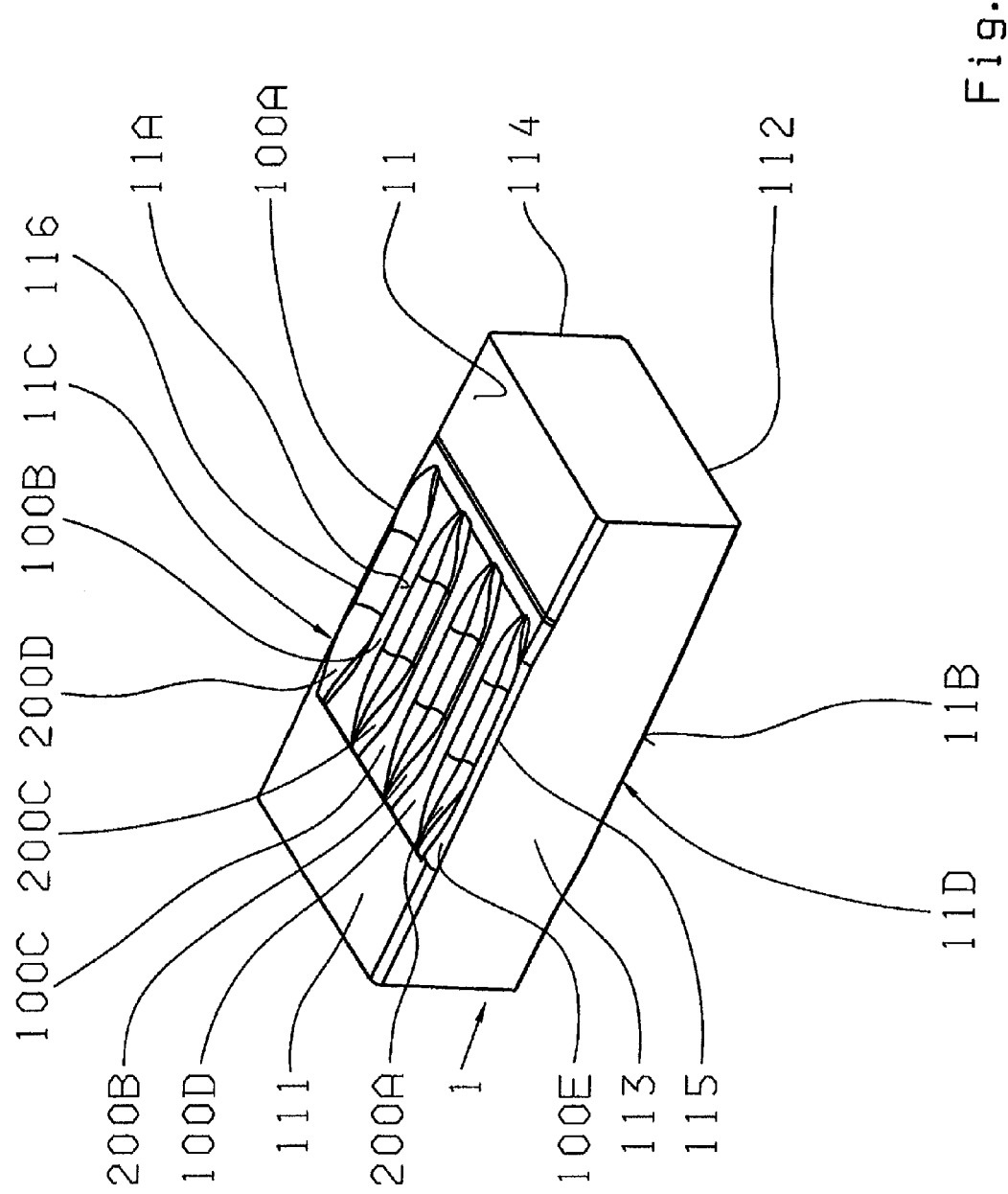

The further embodiment of the transverse leaf spring 1 represented in FIG. 18, the region of the recesses 11C and 11D of the transverse leaf spring 1, is formed with ribs 100A to 100E and grooves 200A to 200D that in the compressed state of the leaf spring 1 alternate and extend in the transverse direction of the vehicle, and that support the function of the regions 1C and 1D. The number of ribs 100A to 100E is selected depending on the width of the transverse leaf spring 1 and the depth of the grooves 200A to 200D, where the side ribs 100A and 100E can be omitted if necessary. In the region of the grooves 200A to 200D, the fiber portion of the transverse leaf spring is compressed or partially displaced onto the ribs 100A to 100E, where the transitions between the ribs 100A to 100E and the grooves 200A to 200D as well as between the remaining surface 11 of the transverse leaf spring 1, are designed optimized for stress so that only minimal stress increases are generated in the transitions. The depth of the grooves 200A to 200D varies in the transverse and longitudinal direction of the vehicle, each substantially having a maximum in the center region, and minimums at opposing edge regions in the transverse vehicle direction.

Figure 19:
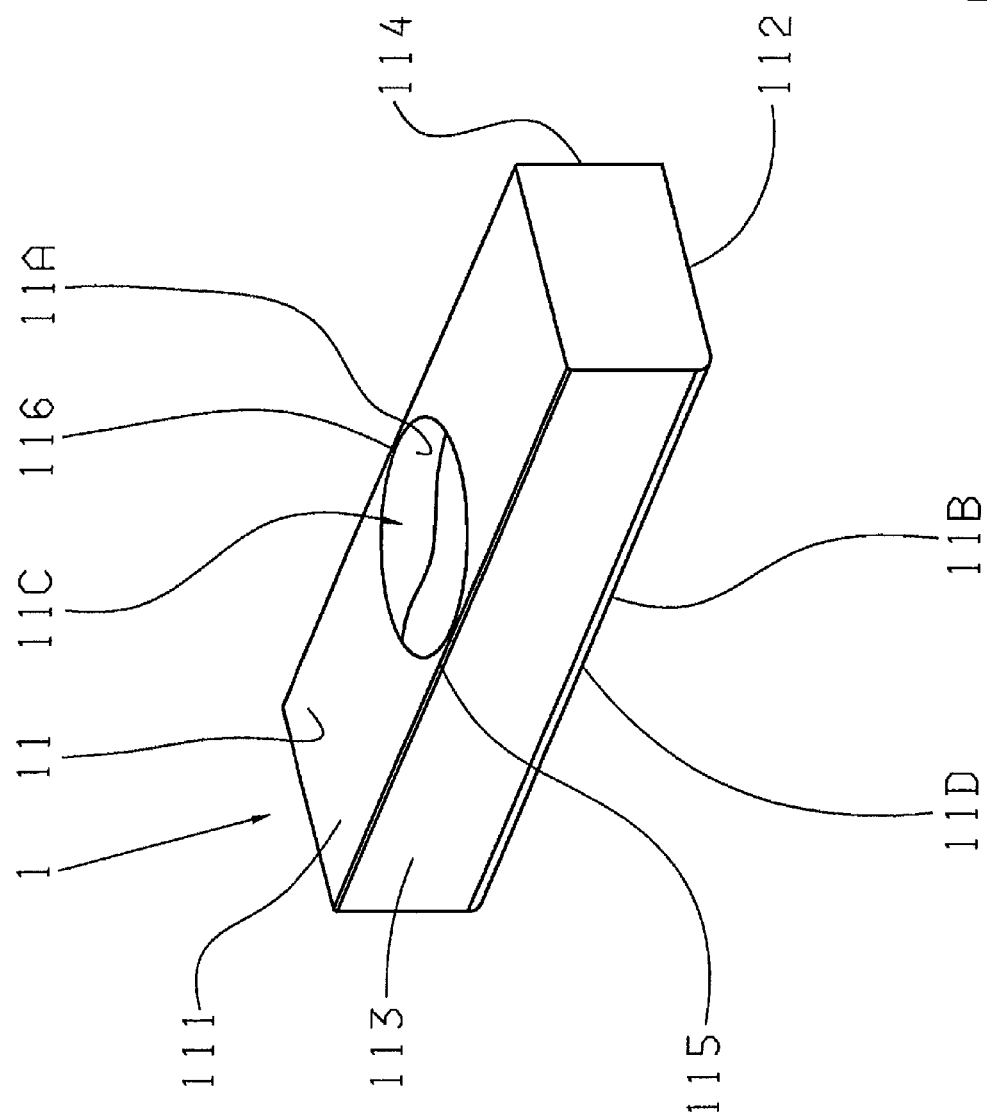

The embodiment of the transverse leaf spring 1 represented in FIG. 19 is formed with recesses 11C and 11D each of which comprises a rotated cosine contour, and is stamped into the surface 11 of the transverse leaf spring 1. In the assembled state of the transverse leaf spring 1, the recesses 11C and 11D are each bounded, in the longitudinal direction x of the vehicle, by edge regions 115 and 116 of the top side 111 and the bottom side 112, formed between a top side 111 and a bottom side 112 and lateral surfaces 113, 114 of the transverse leaf spring 1, where in the region of the edge regions the thickness of the transverse leaf spring 1 preferably corresponds substantially to the thickness outside of the recesses 11C and 11D. As a result of this contour only a minimal stress increase arises in the transition between the bearing location of the transverse leaf spring 1 and the remainder of the surface 11 of the transverse leaf spring 1 surrounding the bearing location. The width of the transverse leaf spring 1 remains substantially uniform, whereby in the cross section of the transverse leaf spring an increased portion of fibers is present in each of the regions of the recesses 11C and 11D.

Due to these recesses 11C and 11D each represented by an indentation, increased transverse and longitudinal forces can be easily transferred from the bearing mechanism 4 into the transverse leaf spring 1. During assembly of the bearing mechanism 4, the insertion devices 9 and 10 are centered on the transverse leaf spring 1 in both the longitudinal and transverse direction of the vehicle by means of the recesses 11C and 11D.

Depending on the present application case, other suitable rotationally symmetric shapes can be provided for the shape of the recesses of the transverse leaf spring, such as a truncated cone, a hemisphere or the like, each having rounded transitions to the remaining surface 11 of the transverse leaf spring 1.

Figure 20:
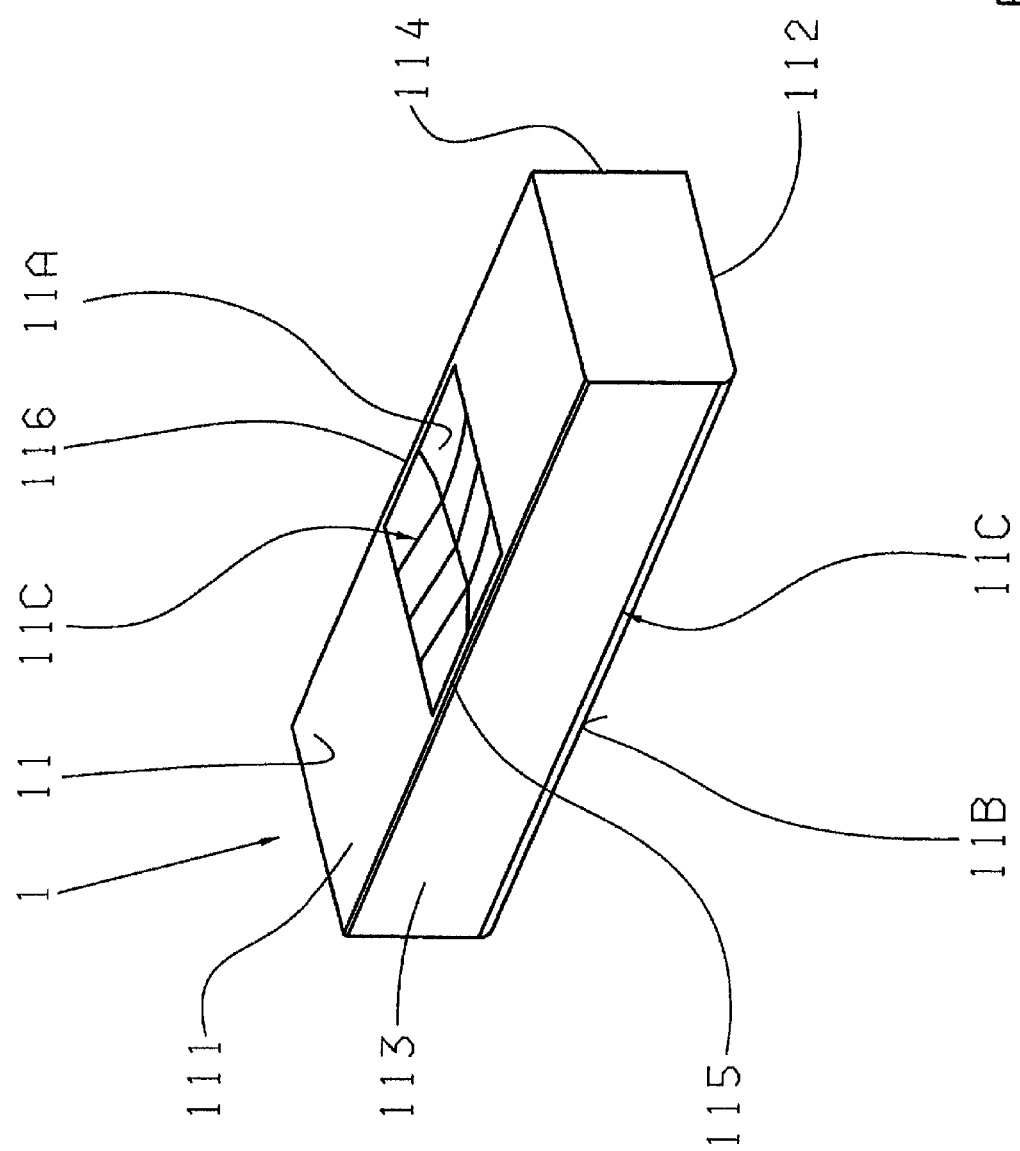

In the example embodiment of the transverse leaf spring 1 according to FIG. 20, the recesses 11C and 11D of the transverse leaf spring 1 are stamped into the transverse leaf spring with a rounded rectangular shape having a cushion-like shape. The contour can be produced by two perpendicularly overlapping cosine contours, which guarantees a minimal stress increase in the region between the bearing location of the bearing mechanism 4 of the transverse leaf spring 1 and the remaining surface 11 of the transverse leaf spring 1. Principally, the possibility exists to design the transverse leaf spring also in the region of the recesses 11C and 11D with the same width as in the remaining progression of the transverse leaf spring 1, whereby an increased portion of fibers is present in the cross section of the transverse leaf spring in the region of the recesses 11C and 11D. In the assembled state of the transverse leaf spring 1, the recesses 11C and 11D are each bounded, in the longitudinal direction x of the vehicle, by edge regions 115 and 116 of the top side 111 and the bottom side 112, formed between a top side 111 and a bottom side 112 and lateral surfaces 113, 114 of the transverse leaf spring 1, where in the region of the edge regions the thickness of the transverse leaf spring 1 preferably corresponds substantially to the thickness outside of the recesses 11C and 11D.

Figure 21:
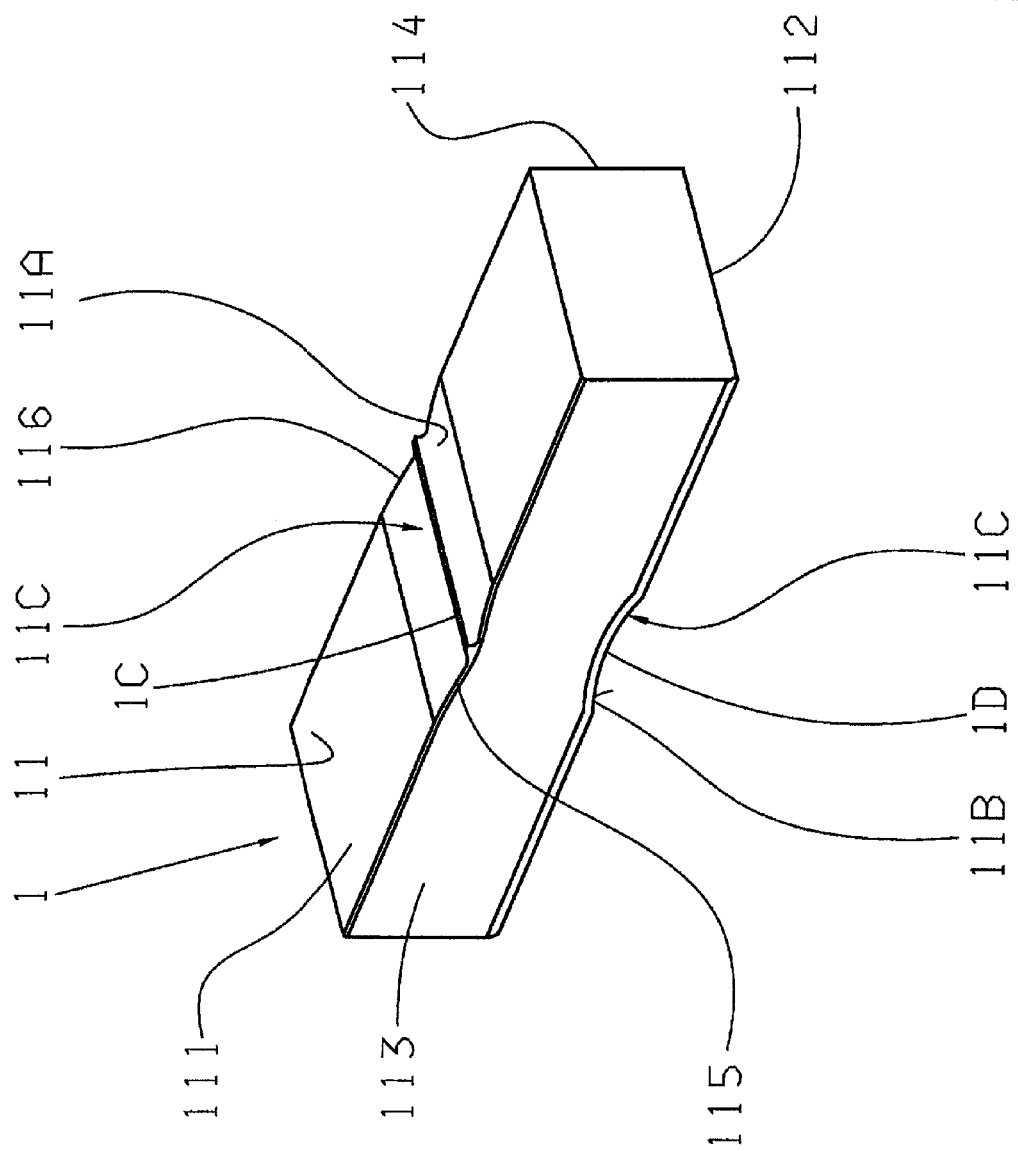

The embodiment of the transverse leaf spring 1 represented in FIG. 21, in the region of the recesses 11C and 11D, comprises a region 1C or 1D each extending over the entire width of the transverse leaf spring 1, where during production the transverse leaf spring 1 is strongly compressed in the vertical direction of the vehicle, or z-direction. This in turn leads to an increased portion of fiber in the contact region of the bearing mechanism 4. The main function of the regions 1C and 1D is centering the bearing mechanism 4 on the transverse leaf spring 1 in the longitudinal direction. If the regions 1C and 1D are designed, starting from a center region of the transverse leaf spring 1, increasing slightly in the direction toward the outsides of the transverse leaf spring 1 in the longitudinal direction of the vehicle, then it is also possible to center the bearing mechanism 4 on the transverse leaf spring 1 in the transverse direction.

Basically, it is also possible to, in the assembled state of the transverse leaf spring 1, to bound the recesses 11C and 11D of the embodiments shown in FIG. 13 to FIG. 18 as well as FIG. 21 in the longitudinal direction x of the vehicle, by edge regions 115 and 116 of the top side 111 and the bottom side 112, formed between a top side 111 and a bottom side 112 and lateral surfaces 113, 114 of the transverse leaf spring 1, where in the region of the edge regions the thickness of the transverse leaf spring 1 preferably corresponds substantially to the thickness outside of the recesses 11C and 11D.

In general, the subject matter according to the invention described above, and the different embodiments of the subject matter according to the invention offer the possibility to support forces and torques applied during operation of a vehicle in the region of a transverse leaf spring without through bores in the transverse leaf spring to the desired extend in the region of the vehicle chassis. Additionally, this requirement is also guaranteed without introducing a foreign part into the transverse leaf spring. This means that forces and torques of central bearings can be transferred again onto a transverse leaf spring without negatively impacting the durability of a transverse leaf spring by holes for bolts or rivets, or other strong redirections of the fibers.

The bearing mechanisms according to the invention are formed with the respectively required high stiffness, and the surface of a transverse leaf spring is not damaged during operation by the appropriately formed bearing mechanisms. Furthermore, the smallest possible stresses during operation occur in the region of the surface of a transverse leaf spring, whereby the transverse leaf spring is not damaged by the bearing mechanism even in the case of alternating loading. Relative movements in the region between the surface of the transverse leaf spring and the bearing mechanisms or the central bearing are avoided in a constructively simple and space-saving manner. The bearing design according to the invention additionally offers in a simple manner the possibility that the torsion axis lies parallel to an xy-plane, and in the longitudinal direction, or x-direction, of the vehicle intersects with the neutral fiber of the transverse leaf spring. An exact positioning of the bearing mechanism on the transverse leaf spring is likewise guaranteed both in the x- and y-direction, whereby a transverse leaf spring can operate with high precision.

If needed, the bearing mechanism according to the invention makes it possible to fasten the bearing leaf spring directly to the vehicle chassis or to the auxiliary frame, without insulation of an auxiliary frame with respect to the vehicle chassis.

The bearing mechanism according to the invention can, without costly constructive measures, also be integrated into different wheel suspension configurations, which are formed having a transverse leaf spring and similar fiber composite components.

The upper and lower halves of the bearing mechanism 4 with respect to the vertical axis z of the vehicle can, depending on the respectively present application, be formed both symmetrically as well as with small asymmetries, where bearing asymmetries of the bearing mechanism 4 can be utilized in a targeted manner for adjusting the bearing stiffness in the different directions.

REFERENCE CHARACTERS 1 transverse leaf spring
1A, 1B end region
1C, 1D region
1C1 to C4 nose
2, 3 outer bearing
4, 5 bearing mechanism
9 insertion device
9A layer element
9B layer element
9C layer element
9C1, 9C2 angled end region
9D insertion part
9D1 recess
9E contact surface
9F receiving device
10 insertion device
10A layer element
10B layer element
10C layer element
10C1, 10C2 angled end region
10D insertion part
10D1 recess
10E contact surface
10F receiving device
11 surface of the transverse leaf spring
11A, 11B support surface
11C, 11D recess of the transverse leaf spring
14 neutral fiber
30 outer bearing shell device
31 bearing ring element
32A, 32B connecting flange
33A, 33B bore hole
34 centering region
35 upper tensioning element
35A, 35B tensioning element
36 lower tensioning element
36A, 36B tensioning element
37A, 37B bore hole
38A, 38B bore hole
39 plate
40 shoulder
41 groove
42 locking ring
43 tips
100A to 100E rib
111 top side of the transverse leaf spring
112 bottom side of the transverse leaf spring
113, 114 lateral surface of the transverse leaf spring 115, 116 edge region of the transverse leaf spring
200A to 200D groove
E3 to E10 sectional plane
x longitudinal direction of the vehicle
y transverse direction of the vehicle
z vertical direction of vehicle

The invention claimed is:

1. A bearing mechanism (4, 5) for a transverse leaf spring (1) for mounted in a region of a vehicle axle of a vehicle, the bearing mechanism (4, 5) comprising:
an outer bearing shell device (30);
insertion devices (9, 10) with at least some regions thereof being encompassed by the outer bearing shell device (30), and each of the insertion devices (9, 10) comprising at least two layer elements (9A, 9B, 9C and 10A, 10B, 10C) with different stiffnesses;
the insertion devices (9, 10), in an assembled state, each being disposed between the outer bearing shell device (30) and the transverse leaf spring (1);
the outer bearing shell device (30) comprising a one-piece bearing ring element (31); and
the insertion devices (9, 10) being operatively connected, at least in a force locking manner, to the one-piece bearing ring element (31) and to the transverse leaf spring (1) via tensioning elements (35, 36; 35A, 35B, 36A, 36B);
wherein a coefficient of friction, in defined surface regions of the tensioning elements, is greater than a coefficient of friction in other surface regions of the tensioning elements (35, 36).

2. The bearing mechanism according to claim 1, wherein the tensioning elements (35, 36; 35A, 35B, 36A, 36B) are formed with at least one at least approximately wedge-shaped region disposable between the insertion devices (9, 10) and the transverse leaf spring (1) and the bearing ring element (31).

3. The bearing mechanism according to claim 1, wherein at least a portion of the tensioning elements (35, 36) is operatively connected to the bearing ring element (31) for creating a tensioning element-side pretensioning force on the insertion devices (9, 10) and the transverse leaf spring (1), and the pretensioning force is supported on a shoulder (40) of the bearing ring element (31).

4. The bearing mechanism according to claim 1, wherein the bearing ring element (31) is secured to the chassis of the vehicle via connecting regions (32A, 32B).

5. The bearing mechanism according to claim 1, wherein a contact region of the bearing ring element (31), which in an assembled state faces the vehicle chassis, is formed with a centering region (34) that corresponds to a centering region on the vehicle chassis.

6. The bearing mechanism according to claim 1, wherein the tensioning elements (35A, 35B, 36A, 36B) are retained in a position that generates the pretensioning force via a plate (39) that is connectable to the bearing ring element (31).

7. The bearing mechanism according to claim 1, wherein the tensioning elements (35, 36; 35A, 35B, 36A, 36B) are disposed at least one of:
between the layer elements (9B, 9C, 10B, 10C) of the insertion devices (9, 10) formed with greater stiffness and the transverse leaf spring (1), and
between the bearing ring element (31) and the layer elements (9B, 9C, 10B, 10C) of the insertion devices (9, 10) formed with greater stiffness.

8. The bearing mechanism according to claim 1, wherein an insertion part (9D to 10D), formed at least nearly semicylindrically, is disposed between the layer elements (9A, 9B, 10A, 10B) and the transverse leaf spring (1), and the insertion part is formed with greater stiffness than the layer elements (9A, 10A) formed with lower stiffness.

9. The bearing mechanism according to claim 8, wherein the insertion parts (9D, 10D), at least in the assembled state, are each formed with a resilient protective coating in contact regions which face the transverse leaf spring (1).

10. The bearing mechanism according to claim 1, wherein at least the layer elements, formed with lower stiffness, comprise recesses.

11. The bearing mechanism according to claim 1, wherein at least in sections of end regions of the layer elements, formed with greater stiffness, have a resilient protective coating.

12. The bearing mechanism according to claim 1, wherein each of the insertion devices (9, 10) comprises a contact surface (9E, 10E) which faces a support surface (11A, 11B) of the transverse leaf spring (1), and the contact surface (9E, 10E) has at least one receiving device (9F, 10F) into which, in the assembled state of the insertion devices (9, 10), a region (11C, 11D) of the transverse leaf spring (1) engages.

13. The bearing mechanism according to claim 1, wherein at least sections of the layer elements (9A, 10A), formed with lower stiffness in the assembled state, each encompass the transverse leaf spring (1) with stop regions (18A, 19B) in a longitudinal direction (x) of the vehicle and a vertical direction (z) of the vehicle, and the stop regions (18A to 19B), in contact regions at least one of facing the transverse leaf spring (1) and facing the outer bearing shells (6, 7), are formed with at least one of projections and recesses oriented at least approximately in a longitudinal direction (x) of the vehicle.

14. A bearing mechanism (4, 5), for a transverse leaf spring (1), to be mounted in a region of a vehicle axle of a vehicle, the bearing mechanism (4, 5) comprising:
an outer bearing shell device (30);
insertion devices (9, 10) with at least some regions thereof being encompassed by the outer bearing shell device (30), and each of the insertion devices (9, 10) comprising at least two layer elements (9A, 9B, 9C and 10A, 10B, 10C) having different stiffnesses;
the insertion devices (9, 10), in an assembled state, each being disposed between the outer bearing shell device (30) and the transverse leaf spring (1);
the outer bearing shell device (30) comprising a one-piece bearing ring element (31); and
the insertion devices (9, 10) being operatively connected, at least in a force locking manner, to the bearing ring element (31) and to the transverse leaf spring (1) via tensioning elements (35, 36; 35A, 35B, 36A, 36B);
wherein the tensioning elements (35A, 35B, 36A, 36B) are retained in a position that generates the pretensioning force via a locking ring (42) that is connectable to the bearing ring element (31).

15. A bearing mechanism (4, 5) for a transverse leaf spring (1) for mounted in a region of a vehicle axle of a vehicle, the bearing mechanism (4, 5) comprising:
an outer bearing shell device (30);
insertion devices (9, 10) with at least some regions thereof being encompassed by the outer bearing shell device (30), and each of the insertion devices (9, 10) comprising at least two layer elements (9A, 9B, 9C and 10A, 10B, 10C) with different stiffnesses;
each of the insertion devices (9, 10), in an assembled state, being disposed between the outer bearing shell device (30) and the transverse leaf spring (1);
the outer bearing shell device (30) comprising a one-piece bearing ring element (31) which both completely circumscribes the transverse leaf spring (1) and is fixedly connected to one of a vehicle chassis and an alternative frame coupled to the vehicle chassis;

each of the insertion devices (9, 10) being operatively connected, at least in a force locking manner, to the one-piece bearing ring element (31) and to the transverse leaf spring (1) via vertically upper and vertically lower tensioning elements (35, 36; 35A, 35B, 36A, 36B); and the vertically upper tensioning element (35, 35A, 35B) being positioned on a vertically upper first side of the transverse leaf spring (1) while the vertically lower tensioning element (36, 36A, 36B) being positioned on a vertically lower first side of the transverse leaf spring (1).

16. The bearing mechanism according to claim 15, wherein the tensioning elements (35, 36; 35A, 35B, 36A, 36B) are formed with at least one approximately wedge-shaped region which is located between transverse leaf spring (1) and the bearing ring element (31) on each of the vertically upper side and the vertically lower side of the transverse leaf spring (1).

17. The bearing mechanism according to claim 15, wherein the one-piece bearing ring element (31) is non-rotationally connected to, one of the vehicle chassis or the alternative frame coupled to the vehicle chassis, so as to resist rotation of the one-piece bearing ring element (31).

* * * * *